US011025985B2

(12) United States Patent
Stojancic et al.

(10) Patent No.: US 11,025,985 B2
(45) Date of Patent: Jun. 1, 2021

(54) AUDIO PROCESSING FOR DETECTING OCCURRENCES OF CROWD NOISE IN SPORTING EVENT TELEVISION PROGRAMMING

(71) Applicant: STATS LLC, Palo Alto, CA (US)

(72) Inventors: Mihailo Stojancic, San Jose, CA (US); Warren Packard, Palo Alto, CA (US)

(73) Assignee: STATS LLC, Chicago, IL (US)

( * ) Notice: Subject to any disclaimer, the term of this patent is extended or adjusted under 35 U.S.C. 154(b) by 0 days.

(21) Appl. No.: 16/421,391

(22) Filed: May 23, 2019

(65) Prior Publication Data

US 2019/0373310 A1    Dec. 5, 2019

Related U.S. Application Data

(60) Provisional application No. 62/680,955, filed on Jun. 5, 2018, provisional application No. 62/712,041, filed
(Continued)

(51) Int. Cl.
*H04N 21/439*    (2011.01)
*G10L 21/0232*    (2013.01)
(Continued)

(52) U.S. Cl.
CPC ..... *H04N 21/4394* (2013.01); *G10L 21/0232* (2013.01); *G10L 25/18* (2013.01);
(Continued)

(58) Field of Classification Search
CPC ......... G10L 15/00; G10L 15/04; G10L 15/05; H04N 21/4394; H04N 21/8549; G06F 3/165
See application file for complete search history.

(56) References Cited

U.S. PATENT DOCUMENTS 6,005,562 A    12/1999   Shiga et al.
6,177,931 B1    1/2001   Alexander et al.
(Continued)

FOREIGN PATENT DOCUMENTS

CN    101650722    10/2011
CN    105912560    8/2016
(Continued)

OTHER PUBLICATIONS

US 10,462,538 B2, 10/2019, Packard et al. (withdrawn)
(Continued)

*Primary Examiner* — Walter F Briney, III
(74) *Attorney, Agent, or Firm* — DLA Piper LLP (US)

(57) ABSTRACT

Metadata for highlights of audiovisual content depicting a sporting event or other event are extracted from audiovisual content. The highlights may be segments of the content, such as a broadcast of a sporting event, that are of particular interest. Audio data for the audiovisual content is stored, and portions of the audio data indicating crowd excitement (noise) is automatically identified by analyzing an audio signal in the joint time and frequency domains. Multiple indicators are derived and subsequently processed to detect, validate, and render occurrences of crowd noise. Metadata are automatically generated, including time of occurrence, level of noise (excitement), and duration of cheering. Metadata may be stored, comprising at least a time index indicating a time, within the audiovisual content, at which each of the portions occurs. Periods of intense crowd noise may be used to identify highlights and/or to indicate crowd excitement during viewing of a highlight.

13 Claims, 13 Drawing Sheets

Related U.S. Application Data on Jul. 30, 2018, provisional application No. 62/746,454, filed on Oct. 16, 2018.

(51) Int. Cl.
*G11B 27/031* (2006.01)
*G10L 25/51* (2013.01)
*H04N 21/433* (2011.01)
*G10L 25/18* (2013.01)

(52) U.S. Cl.
CPC ............ *G10L 25/51* (2013.01); *G11B 27/031* (2013.01); *H04N 21/433* (2013.01)

(56) References Cited

U.S. PATENT DOCUMENTS

| | | |
|---|---|---|
| 6,185,527 B1 | 2/2001 | Petkovic et al. |
| 6,195,458 B1 | 2/2001 | Warnick et al. |
| 6,452,875 B1 | 9/2002 | Lee et al. |
| 6,557,042 B1 | 4/2003 | He et al. |
| 6,681,396 B1 | 1/2004 | Bates et al. |
| 6,721,490 B1 | 4/2004 | Yao et al. |
| 6,954,611 B2 | 10/2005 | Hashimoto et al. |
| 7,174,512 B2 | 2/2007 | Martin et al. |
| 7,197,715 B1 | 3/2007 | Valeria |
| 7,386,217 B2 | 6/2008 | Zhang |
| 7,543,322 B1 | 6/2009 | Bhogal et al. |
| 7,633,887 B2 | 12/2009 | Panwar et al. |
| 7,646,962 B1 | 1/2010 | Ellis et al. |
| 7,680,894 B2 | 3/2010 | Diot et al. |
| 7,742,111 B2 | 6/2010 | Shiu et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,831,112 B2 | 11/2010 | Wang et al. |
| 7,849,487 B1 | 12/2010 | Vosseller |
| 7,929,808 B2 | 4/2011 | Seaman et al. |
| 8,024,753 B1 | 9/2011 | Kummer et al. |
| 8,046,798 B1 | 10/2011 | Schlack et al. |
| 8,079,052 B2 | 12/2011 | Chen et al. |
| 8,099,315 B2 | 1/2012 | Amento |
| 8,104,065 B2 | 1/2012 | Aaby et al. |
| 8,140,570 B2 | 3/2012 | Ingrassia et al. |
| 8,196,168 B1 | 6/2012 | Bryan et al. |
| 8,209,713 B1 | 6/2012 | Lai et al. |
| 8,296,797 B2 | 10/2012 | Olstad et al. |
| 8,296,808 B2 | 10/2012 | Hardacker et al. |
| 8,312,486 B1 | 11/2012 | Briggs et al. |
| 8,320,674 B2 | 11/2012 | Guillou et al. |
| 8,424,041 B2 | 4/2013 | Candelore et al. |
| 8,427,356 B1 | 4/2013 | Satish |
| 8,457,768 B2 | 6/2013 | Hammer et al. |
| 8,535,131 B2 | 9/2013 | Packard et al. |
| 8,595,763 B1 | 11/2013 | Packard et al. |
| 8,627,349 B2 | 1/2014 | Kirby et al. |
| 8,688,434 B1 | 4/2014 | Birnbaum et al. |
| 8,689,258 B2 | 4/2014 | Kemo |
| 8,702,504 B1 | 4/2014 | Hughes et al. |
| 8,713,008 B2 | 4/2014 | Negi |
| 8,752,084 B1 | 6/2014 | Lai et al. |
| 8,793,579 B2 | 7/2014 | Halliday et al. |
| 8,923,607 B1 | 12/2014 | Kwatra et al. |
| 8,966,513 B2 | 2/2015 | John et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,060,210 B2 | 6/2015 | Packard et al. |
| 9,066,156 B2 | 6/2015 | Kapa |
| 9,213,986 B1 | 12/2015 | Buchheit et al. |
| 9,251,853 B2 | 2/2016 | Jeong et al. |
| 9,253,533 B1 | 2/2016 | Morgan et al. |
| 9,264,779 B2 | 2/2016 | Kirby et al. |
| 9,299,364 B1 | 3/2016 | Pereira et al. |
| 9,420,333 B2 | 8/2016 | Martch et al. |
| 9,451,202 B2 | 9/2016 | Beals |
| 9,565,474 B2 | 2/2017 | Petruzzelli et al. |
| 9,578,377 B1 | 2/2017 | Malik et al. |
| 9,583,149 B2 | 2/2017 | Stieglitz |
| 9,648,379 B2 | 5/2017 | Howcroft |
| 9,715,902 B2 | 7/2017 | Coviello et al. |
| 9,788,062 B2 | 10/2017 | Dimov et al. |
| 10,014,008 B2 | 7/2018 | Cho et al. |
| 10,056,116 B2 | 8/2018 | Packard et al. |
| 10,297,287 B2 | 5/2019 | Maisenbacher et al. |
| 10,419,830 B2 | 9/2019 | Packard et al. |
| 10,433,030 B2 | 10/2019 | Packard et al. |
| 2001/0013123 A1 | 8/2001 | Freeman et al. |
| 2001/0026609 A1 | 10/2001 | Weinstein et al. |
| 2002/0041752 A1 | 4/2002 | Abiko et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0136528 A1 | 9/2002 | Dagtas |
| 2002/0157095 A1 | 10/2002 | Masumitsu et al. |
| 2002/0157101 A1 | 10/2002 | Schrader et al. |
| 2002/0174430 A1 | 11/2002 | Ellis et al. |
| 2002/0178444 A1 | 11/2002 | Trajkovic et al. |
| 2002/0180774 A1 | 12/2002 | Errico et al. |
| 2002/0194095 A1 | 12/2002 | Koren |
| 2003/0012554 A1 | 1/2003 | Zeidler et al. |
| 2003/0023742 A1 | 1/2003 | Allen et al. |
| 2003/0056220 A1 | 3/2003 | Thornton et al. |
| 2003/0063798 A1 | 4/2003 | Li et al. |
| 2003/0066077 A1 | 4/2003 | Gutta |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0154475 A1 | 8/2003 | Rodriguez et al. |
| 2003/0172376 A1 | 9/2003 | Coffin |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0003403 A1 | 1/2004 | Marsh |
| 2004/0041831 A1 | 3/2004 | Zhang |
| 2004/0167767 A1* | 8/2004 | Xiong ................... G10L 25/00 704/1 |
| 2004/0181807 A1 | 9/2004 | Theiste et al. |
| 2005/0005308 A1 | 1/2005 | Logan et al. |
| 2005/0015712 A1 | 1/2005 | Plastina |
| 2005/0030977 A1 | 2/2005 | Casev et al. |
| 2005/0044570 A1 | 2/2005 | Poslinski |
| 2005/0071865 A1 | 3/2005 | Martins |
| 2005/0071881 A1 | 3/2005 | Deshpande |
| 2005/0091690 A1 | 4/2005 | Delpuch et al. |
| 2005/0120368 A1 | 6/2005 | Goronzy et al. |
| 2005/0125302 A1 | 6/2005 | Brown et al. |
| 2005/0149965 A1 | 7/2005 | Neogi |
| 2005/0152565 A1 | 7/2005 | Jouppi et al. |
| 2005/0154987 A1 | 7/2005 | Otsuka et al. |
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 | 9/2006 | Proebstel |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |

(56) References Cited

U.S. PATENT DOCUMENTS

| | | |
|---|---|---|
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0204302 A1 | 8/2007 | Calzone |
| 2007/0212023 A1 | 9/2007 | Whillock |
| 2007/0226766 A1 | 9/2007 | Poslinski et al. |
| 2007/0239856 A1 | 10/2007 | Abadir |
| 2007/0245379 A1 | 10/2007 | Agnihortri |
| 2007/0250777 A1 | 10/2007 | Chen et al. |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0064490 A1 | 3/2008 | Ellis |
| 2008/0086743 A1 | 4/2008 | Cheng et al. |
| 2008/0092168 A1 | 4/2008 | Logan et al. |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1 | 6/2008 | Collet et al. |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel |
| 2009/0055385 A1 | 2/2009 | Jean et al. |
| 2009/0080857 A1 | 3/2009 | St. John-Larkin |
| 2009/0082110 A1 | 3/2009 | Relyea et al. |
| 2009/0102984 A1 | 4/2009 | Arlina et al. |
| 2009/0138902 A1 | 5/2009 | Kamen |
| 2009/0144777 A1 | 6/2009 | Mikami et al. |
| 2009/0157391 A1 | 6/2009 | Bilobrov |
| 2009/0158357 A1 | 6/2009 | Miller |
| 2009/0178071 A1 | 7/2009 | Whitehead |
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0293093 A1 | 11/2009 | Igarashi |
| 2009/0299824 A1 | 12/2009 | Barnes |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1 | 5/2010 | Vunic |
| 2010/0125864 A1 | 5/2010 | Dwyer et al. |
| 2010/0146560 A1 | 6/2010 | Bonfrer |
| 2010/0153856 A1 | 6/2010 | Russ |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue et al. |
| 2010/0251305 A1 | 9/2010 | Kimble et al. |
| 2010/0262986 A1 | 10/2010 | Adimatvam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0075851 A1* | 3/2011 | LeBoeuf ............... H04R 29/00 381/56 |
| 2011/0082858 A1 | 4/2011 | Yu et al. |
| 2011/0109801 A1 | 5/2011 | Thomas et al. |
| 2011/0138418 A1 | 6/2011 | Choi et al. |
| 2011/0161242 A1 | 6/2011 | Chung et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1 | 9/2011 | Packard et al. |
| 2011/0217024 A1 | 9/2011 | Schlieski et al. |
| 2011/0231887 A1 | 9/2011 | West |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis et al. |
| 2012/0052941 A1 | 3/2012 | Mo |
| 2012/0060178 A1 | 3/2012 | Minakuchi et al. |
| 2012/0082431 A1 | 4/2012 | Sengupta et al. |
| 2012/0106932 A1 | 5/2012 | Grevers, Jr. |
| 2012/0110615 A1 | 5/2012 | Kilar |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman et al. |
| 2012/0278834 A1 | 11/2012 | Richardson |
| 2012/0278837 A1 | 11/2012 | Gurtis et al. |
| 2012/0284745 A1 | 11/2012 | Strange |
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack et al. |
| 2013/0055304 A1 | 2/2013 | Kirby et al. |
| 2013/0061313 A1 | 3/2013 | Cullimore et al. |
| 2013/0073473 A1 | 3/2013 | Heath |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |
| 2013/0138435 A1 | 5/2013 | Weber |
| 2013/0138693 A1 | 5/2013 | Sathish et al. |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1 | 8/2013 | Beining et al. |
| 2013/0251331 A1 | 9/2013 | Sambongi |
| 2013/0263189 A1 | 10/2013 | Garner |
| 2013/0268620 A1 | 10/2013 | Osminer |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |

(56) References Cited

U.S. PATENT DOCUMENTS

| | | |
|---|---|---|
| 2013/0325869 A1 | 12/2013 | Reiley et al. |
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0023348 A1 | 1/2014 | O'Kelly et al. |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1 | 3/2014 | Archibong |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1 | 3/2014 | Shah |
| 2014/0082670 A1 | 3/2014 | Papish |
| 2014/0088952 A1 | 3/2014 | Fife et al. |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0130094 A1 | 5/2014 | Kirby et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatyam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0223479 A1 | 8/2014 | Krishnamoorthi et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0298378 A1 | 10/2014 | Kelley |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0330556 A1* | 11/2014 | Resch .................. G10H 1/0008 704/221 |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0082172 A1 | 3/2015 | Shakib et al. |
| 2015/0095932 A1 | 4/2015 | Ren |
| 2015/0110461 A1 | 4/2015 | Maisenbacher et al. |
| 2015/0110462 A1 | 4/2015 | Maisenbacher et al. |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0243326 A1 | 8/2015 | Pacurariu et al. |
| 2015/0249803 A1 | 9/2015 | Tozer et al. |
| 2015/0249864 A1 | 9/2015 | Tang et al. |
| 2015/0281778 A1 | 10/2015 | Xhafa et al. |
| 2015/0310725 A1 | 10/2015 | Koskan et al. |
| 2015/0310894 A1 | 10/2015 | Stieglitz |
| 2015/0334461 A1 | 11/2015 | Yu |
| 2015/0358687 A1 | 12/2015 | Kummer |
| 2015/0358688 A1 | 12/2015 | Kummer |
| 2016/0066020 A1 | 3/2016 | Mountain |
| 2016/0066026 A1 | 3/2016 | Mountain |
| 2016/0066042 A1 | 3/2016 | Dimov et al. |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli |
| 2016/0105708 A1 | 4/2016 | Packard et al. |
| 2016/0105733 A1 | 4/2016 | Packard et al. |
| 2016/0105734 A1 | 4/2016 | Packard et al. |
| 2016/0191147 A1 | 6/2016 | Martch |
| 2016/0198229 A1 | 7/2016 | Keipert |
| 2016/0309212 A1 | 10/2016 | Martch et al. |
| 2016/0314803 A1* | 10/2016 | Stone ...................... G10L 25/48 |
| 2017/0032630 A1* | 2/2017 | Gervais .................... G08B 6/00 |
| 2018/0014072 A1 | 1/2018 | Dimov et al. |

FOREIGN PATENT DOCUMENTS

| | | |
|---|---|---|
| EP | 1469476 | 10/2004 |
| EP | 1865716 | 12/2007 |
| EP | 2902568 | 12/2007 |
| EP | 2107477 | 10/2009 |
| EP | 2309733 | 4/2011 |
| EP | 2403239 | 1/2012 |
| EP | 2464138 | 6/2012 |
| JP | 10322622 | 12/1998 |
| JP | 2001251581 | 9/2001 |
| JP | 2004072540 | 3/2004 |
| JP | 2004260297 | 9/2004 |
| JP | 2005-317165 | 11/2005 |
| JP | 2006211311 | 8/2006 |
| JP | 2006-245745 | 9/2006 |
| JP | 2006333451 | 12/2006 |
| JP | 2007202206 | 8/2007 |
| JP | 2008167019 | 7/2008 |
| JP | 2012-029150 | 2/2012 |
| JP | 5034516 | 9/2012 |
| JP | 2013-175854 | 9/2013 |
| JP | 2014-157460 | 8/2014 |
| JP | 2014187687 | 10/2014 |
| KR | 2004-0025073 | 3/2004 |
| KR | 2006-0128295 | 12/2006 |
| KR | 10-0863122 | 10/2008 |
| KR | 10-1128521 | 3/2012 |
| WO | 9837694 | 8/1998 |
| WO | 0243353 | 5/2002 |
| WO | 2005059807 | 6/2005 |
| WO | 2007064987 | 6/2007 |
| WO | 2007098067 | 8/2007 |
| WO | 2009073925 | 6/2009 |
| WO | 2011040999 | 4/2011 |
| WO | 2013016626 | 1/2013 |
| WO | 2013166456 | 11/2013 |
| WO | 2014072742 | 5/2014 |
| WO | 2014164782 | 10/2014 |
| WO | 2014179017 | 11/2014 |
| WO | 2016030380 | 3/2016 |
| WO | 2016030384 | 3/2016 |
| WO | 2016030477 | 3/2016 |
| WO | 2016033545 | 3/2016 |
| WO | 2016034899 | 3/2016 |
| WO | 2016055761 | 4/2016 |
| WO | 2016057416 | 4/2016 |
| WO | 2016057844 | 4/2016 |

OTHER PUBLICATIONS

Boxfish/TV's API; www.boxfish.com, (retrieved Mar. 28, 2017), 5 pages.

International Search Report for PCT/US2014/060651 dated Jan. 19, 2015 (9 pages).

International Search Report for PCT/US2014/060649 dated Jan. 8, 2015 (9 pages).

Jin, S.H., et al., "Intelligent broadcasting system and services for personalized semantic contents consumption", Expert Systems with Applications, Oxford, GB, vol. 31, No. 1, Jul. 1, 2006, pp. 164-173.

Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.

Thuuz Sports, "Frequently Asked Questions", www.thuuz.com/faq/, (retrieved Mar. 28, 2017), 5 pages.

(56) References Cited

OTHER PUBLICATIONS

R. Natarajan et Al. "Audio-Based Event Detection in Videos—A Comprehensive Survey", Int. Journal of Engineering and Technology, vol. 6 No. 4 Aug.-Sep. 2014.

Q. Huang et al. "Hierarchical Language Modeling for Audio Events Detection in a Sports Game", IEEE International Conference on Acoustics, Speech and Signal Processing, 2010.

"Q. Huang et al. "Inferring the Structure of a Tennis Game Using Audio Information", IEEE Trans. on Audio Speech and Language Proc., Oct. 2011."

M. Baillie et al. "Audio-based Event Detection for Sports Video", International Conference on Image and Video, CIVR 2003.

Y. Rui et al. "Automatically Extracting Highlights for TV Baseball Programs", Proceedings of the eighth ACM international conference on Multimedia, 2000.

D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.

E. Kijak et al. "Audiovisual Integration for Tennis Broadcast Structuring", Multimedia Tools and Applications, Springer, vol. 30, Issue 3, pp. 289-311, Sep. 2006.

A. Baijal et al. "Sports Highlights Generation Based on Acoustic Events Detection: A Rugby Case Study", IEEE International Conference on Consumer Electronics (ICCE), pp. 20-23, 2015.

J. Han et al. "A Unified and Efficient Framework for Court-Net Sports Video Analysis Using 3-D Camera Modeling", Proceedings vol. 6506, Multimedia Content Access: Algorithms and Systems; 65060F (2007).

Huang-Chia Shih "A Survey on Content-aware Video Analysis for Sports", IEEE Trans. on Circuits and Systems for Video Technology, vol. 99, No. 9, Jan. 2017.

A. Krizhevsky et al. "ImageNet Classification with Deep Convolutional Neural Networks", In Proc. NIPS, pp. 1097-1105, 2012.

D. A. Sadlier et al. "Event Detection in Field Sports Video Using Audio-Visual Features and a Support Vector Machine", IEEE Trans. on Circuits and Systems for Video Technology, vol. 15, No. 10, Oct. 2005.

P. F. Felzenszwalb et al. "Efficient Graph-Based Image Segmentation", International Journal of Computer Vision, Sep. 2004, vol. 59, Issue 2, pp. 167-181.

C. J. C. Burges "A Tutorial on Support Vector Machines for Pattern Recognition", Springer, Data Mining and Knowledge Discovery, Jun. 1998, vol. 2, Issue 2, pp. 121-167.

Y.A. LeCun et al. "Efficient BackProp" Neural Networks: Tricks of the Trade. Lecture Notes in Computer Science, vol. 7700, Springer, 2012.

L. Neumann, J. Matas, "Real-Time Scene Text Localization and Recognition", 5th IEEE Conference on Computer Vision and Pattern Recognition, Jun. 2012.

R. Smith "An Overview of the Tesseract OCR Engine", International Conference on Document Analysis and Recognition (ICDAR), 2007.

M. Merler, et al., "The Excitement of Sports: Automatic Highlights Using Audio/Visual Cues", Dec. 31, 2017, pp. 2520-2523.

H. Harb, et al., Highlights Detection in Sports Videos Based on Audio Analysis, pp. 1-4, Sep. 2009.

J. Ye, et al., Audio-Based Sports Highlight Detection by Fourier Local-Auto-Correlations, 11th Annual Conference of the International Speech Communication Association, Sep. 2010, pp. 2198-2201.

Miyamori, Hisashi "Automatic Generation of Personalized Digest Based on Context Flow and Distinctive Events", IEICE Technical Report, Jul. 10, 2003, vol. 103, No. 209, pp. 35-40.

\* cited by examiner

AUDIO PROCESSING FOR DETECTING OCCURRENCES OF CROWD NOISE IN SPORTING EVENT TELEVISION PROGRAMMING

CROSS-REFERENCE TO RELATED APPLICATIONS

The present application claims the benefit of U.S. Provisional Application Ser. No. 62/680,955 for "Audio Processing for Detecting Occurrences of Crowd Noise in Sporting Event Television Programming", filed Jun. 5, 2018, which is incorporated herein by reference in its entirety.

The present application claims the benefit of U.S. Provisional Application Ser. No. 62/712,041 for "Audio Processing for Extraction of Variable Length Disjoint Segments from Television Signal", filed Jul. 30, 2018, which is incorporated herein by reference in its entirety.

The present application claims the benefit of U.S. Provisional Application Ser. No. 62/746,454 for "Audio Processing for Detecting Occurrences of Loud Sound Characterized by Short-Time Energy Bursts", filed Oct. 16, 2018, which is incorporated herein by reference in its entirety.

The present application is related to U.S. Utility application Ser. No. 13/601,915 for "Generating Excitement Levels for Live Performances," filed Aug. 31, 2012 and issued on Jun. 16, 2015 as U.S. Pat. No. 9,060,210, which is incorporated by reference herein in its entirety.

The present application is related to U.S. Utility application Ser. No. 13/601,927 for "Generating Alerts for Live Performances," filed Aug. 31, 2012 and issued on Sep. 23, 2014 as U.S. Pat. No. 8,842,007, which is incorporated by reference herein in its entirety.

The present application is related to U.S. Utility application Ser. No. 13/601,933 for "Generating Teasers for Live Performances," filed Aug. 31, 2012 and issued on Nov. 26, 2013 as U.S. Pat. No. 8,595,763, which is incorporated by reference herein in its entirety.

The present application is related to U.S. Utility application Ser. No. 14/510,481 for "Generating a Customized Highlight Sequence Depicting an Event", filed Oct. 9, 2014, which is incorporated by reference herein in its entirety.

The present application is related to U.S. Utility application Ser. No. 14/710,438 for "Generating a Customized Highlight Sequence Depicting Multiple Events", filed May 12, 2015, which is incorporated by reference herein in its entirety.

The present application is related to U.S. Utility application Ser. No. 14/877,691 for "Customized Generation of Highlight Show with Narrative Component", filed Oct. 7, 2015, which is incorporated by reference herein in its entirety.

The present application is related to U.S. Utility application Ser. No. 15/264,928 for "User Interface for Interaction with Customized Highlight Shows", filed Sep. 14, 2016, which is incorporated by reference herein in its entirety.

The present application is related to U.S. Utility application Ser. No. 16/411,704 for "Video Processing for Enabling Sports Highlights Generation", filed May 14, 2019 which is incorporated herein by reference in its entirety.

The present application is related to U.S. Utility application Ser. No. 16/411,710 for "Machine Learning for Recognizing and Interpreting Embedded Information Card Content", filed May 14, 2019, which is incorporated herein by reference in its entirety.

The present application is related to U.S. Utility application Ser. No. 16/411,713 for "Video Processing for Embedded Information Card Localization and Content Extraction", filed May 14, 2019, which is incorporated herein by reference in its entirety.

TECHNICAL FIELD

The present document relates to techniques for identifying multimedia content and associated information on a television device or a video server delivering multimedia content, and enabling embedded software applications to utilize the multimedia content to provide content and services synchronous with that multimedia content. Various embodiments relate to methods and systems for providing automated audio analysis to identify and extract information from television programming content depicting sporting events, so as to create metadata associated with video highlights for in-game and post-game viewing.

DESCRIPTION OF THE RELATED ART

Enhanced television applications such as interactive advertising and enhanced program guides with pre-game, in-game and post-game interactive applications have long been envisioned. Existing cable systems that were originally engineered for broadcast television are being called on to support a host of new applications and services including interactive television services and enhanced (interactive) programming guides.

Some frameworks for enabling enhanced television applications have been standardized. Examples include the Open-Cable™ Enhanced TV Application Messaging Specification, as well as the Tru2way specification, which refer to interactive digital cable services delivered over a cable video network and which include features such as interactive program guides, interactive ads, games, and the like. Additionally, cable operator "OCAP" programs provide interactive services such as e-commerce shopping, online banking, electronic program guides, and digital video recording. These efforts have enabled the first generation of video-synchronous applications, synchronized with video content delivered by the programmer/broadcaster, and providing added data and interactivity to television programming.

Recent developments in video/audio content analysis technologies and capable mobile devices have opened up an array of new possibilities in developing sophisticated applications that operate synchronously with live TV programming events. These new technologies and advances in audio signal processing and computer vision, as well as improved computing power of modern processors, allow for real-time generation of sophisticated programming content highlights accompanied by metadata that are currently lacking in the television and other media environments.

SUMMARY

A system and method are presented to enable automatic real-time processing of audio data, such as audio streams extracted from sporting event television programming content, for detecting, selecting, and tracking of pronounced crowd noise (e.g., audience cheering).

In at least one embodiment, a spectrogram of the audio data is constructed, and any pronounced collections of spectral magnitude peaks are identified at each position of a sliding two-dimensional time-frequency area window. A spectral indicator is generated for each position of the analysis window, and a vector of spectral indicators with associated time positions is formed. In subsequent processing steps, runs of selected indicator-position pairs with narrow time spacing are identified as potential events of interest. For each run, internal indicator values are sorted, so as to obtain maximum magnitude indicator values with associated time positions. In addition, time position (start/median) and duration (count of the indicator-position pairs) are extracted for each run. A preliminary events vector is formed, containing triplets of parameters (M, P, D), representing maximum indicator value, start/median time position, and run duration for each event. This preliminary event vector is subsequently processed to generate final crowd-noise event vectors corresponding to desired event intervals, event loudness, and event duration.

In at least one embodiment, once the crowd noise event information has been extracted, it is automatically appended to sporting event metadata associated with the sporting event video highlights, and can be subsequently used in connection with automatic generation of highlights.

In at least one embodiment, a method for extracting metadata from an audiovisual stream of an event may include storing, at a data store, audio data extracted from the audiovisual stream, using a processor to automatically identify one or more portions of the audio data that indicate crowd excitement at the event, and storing metadata in the data store, including at least a time index indicating a time, within the audiovisual stream, at which each of the portions occurs. Alternatively the audio data can be extracted from an audio stream, or from previously stored audiovisual content or audio content.

The audiovisual stream may be a broadcast of the event. The event may be a sporting event, or any other type of event. The metadata may pertain to a highlight deemed to be of particular interest to one or more users.

The method may further include using an output device to present the metadata during viewing of the highlight by one of the one or more users to indicate a crowd excitement level pertaining to the highlight.

The method may further include using the time index to identify a beginning and/or an end of the highlight. As described below, the beginning and/or end of the highlight can be adjusted based on an offset.

The method may further include using an output device to present the highlight to one of the one or more users during automatic identification of the one or more portions.

The method may further include, prior to automatic identification of the one or more portions, pre-processing the audio data by resampling the audio data to a desired sampling rate.

The method may further include, prior to automatic identification of the one or more portions, pre-processing the audio data by filtering the audio data to reduce or remove noise.

The method may further include, prior to automatic identification of the one or more portions, pre-processing the audio data to generate a spectrogram (two-dimensional time-frequency representation) for at least part of the audio data.

Automatically identifying the one or more portions may include identifying spectral magnitude peaks in each position of a sliding two-dimensional time-frequency analysis window of the spectrogram.

Automatically identifying the one or more portions may further include generating a spectral indicator for each position of the analysis window, and using the spectral indicators to form a vector of spectral indicators with associated time portions.

The method may further include identifying runs of selected pairs of spectral indicators and analysis window positions, capturing the identified runs in a set of R vectors, and using the set of R vectors to obtain one or more maximum magnitude indicators.

The method may further include extracting the time index from each of the R vectors.

The method may further include generating a preliminary event vector by replacing each R vector with a parameter triplet representing the maximum magnitude indicator, the time index, and a run length of one of the runs.

The method may further include processing the preliminary event vector to generate crowd noise event information including the time index.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

Definitions

Figure 1A:
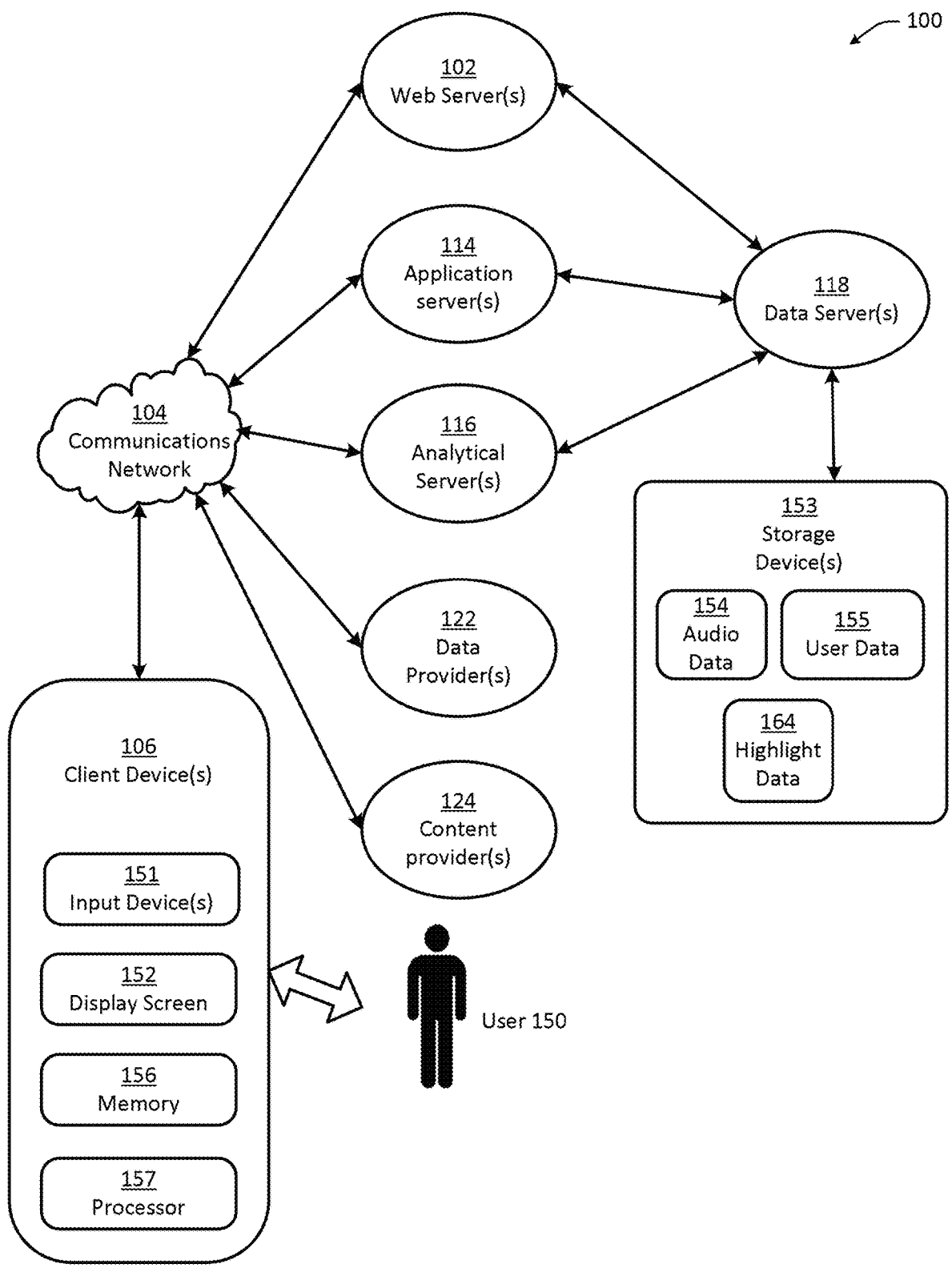
FIG. 1A is a block diagram depicting a hardware architecture according to a client/server embodiment, wherein event content is provided via a network-connected content provider.

The following definitions are presented for explanatory purposes only, and are not intended to limit scope.

Event: For purposes of the discussion herein, the term "event" refers to a game, session, match, series, performance, program, concert, and/or the like, or portion thereof (such as an act, period, quarter, half, inning, scene, chapter, or the like). An event may be a sporting event, entertainment event, a specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight shows for any audiovisual, audio, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.

Highlight: An excerpt or portion of an event, or of content associated with an event that is deemed to be of particular interest to one or more users. A highlight can be of any length. In general, the techniques described herein provide mechanisms for identifying and presenting a set of customized highlights (which may be selected based on particular characteristics and/or preferences of the user) for any suitable event. "Highlight" can also be used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the audiovisual stream depicting the event itself), or retrieved from any number of other sources. Different types of highlights can be provided, including for example, occurrences (plays), strings, possessions, and sequences, all of which are defined below. Highlights need not be of fixed duration, but may incorporate a start offset and/or end offset, as described below.

Clip: A portion of an audio, visual, or audiovisual representation of an event. A clip may correspond to or represent a highlight. In many contexts herein, the term "segment" is used interchangeably with "clip". A clip may be a portion of an audio stream, video stream, or audiovisual stream, or it may be a portion of stored audio, video, or audiovisual content.

Content Delineator: One or more video frames that indicate the start or end of a highlight.

Occurrence: Something that takes place during an event. Examples include: a goal, a play, a down, a hit, a save, a shot on goal, a basket, a steal, a snap or attempted snap, a near-miss, a fight, a beginning or end of a game, quarter, half, period, or inning, a pitch, a penalty, an injury, a dramatic incident in an entertainment event, a song, a solo, and/or the like. Occurrences can also be unusual, such as a power outage, an incident with an unruly fan, and/or the like. Detection of such occurrences can be used as a basis for determining whether or not to designate a particular portion of an audiovisual stream as a highlight. Occurrences are also referred to herein as "plays", for ease of nomenclature, although such usage should not be construed to limit scope. Occurrences may be of any length, and the representation of an occurrence may be of varying length. For example, as mentioned above, an extended representation of an occurrence may include footage depicting the period of time just before and just after the occurrence, while a brief representation may include just the occurrence itself. Any intermediate representation can also be provided. In at least one embodiment, the selection of a duration for a representation of an occurrence can depend on user preferences, available time, determined level of excitement for the occurrence, importance of the occurrence, and/or any other factors.

Offset: The amount by which a highlight length is adjusted. In at least one embodiment, a start offset and/or end offset can be provided, for adjusting start and/or end times of the highlight, respectively. For example, if a highlight depicts a goal, the highlight may be extended (via an end offset) for a few seconds so as to include celebrations and/or fan reactions following the goal. Offsets can be configured to vary automatically or manually, based for example on an amount of time available for the highlight, importance and/or excitement level of the highlight, and/or any other suitable factors.

String: A series of occurrences that are somehow linked or related to one another. The occurrences may take place within a possession (defined below), or may span multiple possessions. The occurrences may take place within a sequence (defined below), or may span multiple sequences. The occurrences can be linked or related because of some thematic or narrative connection to one another, or because one leads to another, or for any other reason. One example of a string is a set of passes that lead to a goal or basket. This is not to be confused with a "text string," which has the meaning ordinarily ascribed to it in the computer programming arts.

Possession: Any time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, a possession is defined as a half-inning. For football, a possession can include a number of sequences in which the same team has the ball. For other types of sporting events as well as for non-sporting events, the term "possession" may be somewhat of a misnomer, but is still used herein for illustrative purposes. Examples in a non-sporting context may include a chapter, scene, act, or the like. For example, in the context of a music concert, a possession may equate to performance of a single song. A possession can include any number of occurrences.

Sequence: A time-delimited portion of an event that includes one continuous time period of action. For example, in a sporting event, a sequence may begin when action begins (such as a face-off, tipoff, or the like), and may end when the whistle is blown to signify a break in the action. In a sport such as baseball or football, a sequence may be equivalent to a play, which is a form of occurrence. A sequence can include any number of possessions, or may be a portion of a possession.

Highlight show: A set of highlights that are arranged for presentation to a user. The highlight show may be presented linearly (such as an audiovisual stream), or in a manner that allows the user to select which highlight to view and in which order (for example by clicking on links or thumbnails). Presentation of highlight show can be non-interactive or interactive, for example allowing a user to pause, rewind, skip, fast-forward, communicate a preference for or against, and/or the like. A highlight show can be, for example, a condensed game. A highlight show can include any number of contiguous or noncontiguous highlights, from a single event or from multiple events, and can even include highlights from different types of events (e.g. different sports, and/or a combination of highlights from sporting and non-sporting events).

User/viewer: The terms "user" or "viewer" interchangeably refer to an individual, group, or other entity that is watching, listening to, or otherwise experiencing an event, one or more highlights of an event, or a highlight show. The terms "user" or "viewer" can also refer to an individual, group, or other entity that may at some future time watch, listen to, or otherwise experience either an event, one or more highlights of an event, or a highlight show. The term "viewer" may be used for descriptive purposes, although the event need not have a visual component, so that the "viewer" may instead be a listener or any other consumer of content.

Excitement level: A measure of how exciting or interesting an event or highlight is expected to be for a particular user or for users in general. Excitement levels can also be determined with respect to a particular occurrence or player. Various techniques for measuring or assessing excitement level are discussed in the above-referenced related applications. As discussed, excitement level can depend on occurrences within the event, as well as other factors such as overall context or importance of the event (playoff game, pennant implications, rivalries, and/or the like). In at least one embodiment, an excitement level can be associated with each occurrence, string, possession, or sequence within an event. For example, an excitement level for a possession can be determined based on occurrences that take place within that possession. Excitement level may be measured differently for different users (e.g. a fan of one team vs. a neutral fan), and it can depend on personal characteristics of each user.

Metadata: Data pertaining to and stored in association with other data. The primary data may be media such as a sports program or highlight.

Video data. A length of video, which may be in digital or analog form. Video data may be stored at a local storage device, or may be received in real-time from a source such as a TV broadcast antenna, a cable network, or a computer server, in which case it may also be referred to as a "video stream". Video data may or may not include an audio component; if it includes an audio component, it may be referred to as "audiovisual data" or an "audiovisual stream".

Audio data. A length of audio, which may be in digital or analog form. Audio data may be the audio component of audiovisual data or an audiovisual stream, and may be isolated by extracting the audio data from the audiovisual data. Audio data may be stored at a local storage, or may be received in real-time from a source such as a TV broadcast antenna, a cable network, or a computer server, in which case it may also be referred to as an "audio stream".

Stream. An audio stream, video stream, or audiovisual stream.

Time index. An indicator of a time, within audio data, video data, or audiovisual data, at which an event occurs or that otherwise pertains to a designated segment, such as a highlight.

Spectrogram. A visual representation of the spectrum of frequencies of a signal, such as an audio stream, as it varies with time.

Analysis window. A designated subset of video data, audio data, audiovisual data, spectrogram, stream, or otherwise processed version of a stream or data, at which one step of analysis is to be focused. The audio data, video data, audiovisual data, or spectrogram may be analyzed, for example, in segments using a moving analysis window and/or a series of analysis windows covering different segments of the data or spectrogram.

Overview

According to various embodiments, methods and systems are provided for automatically creating time-based metadata associated with highlights of television programming of a sporting event or the like, wherein such video highlights and associated metadata are generated synchronously with the television broadcast of a sporting event or the like, or while the sporting event video content is being streamed via a video server from a storage device after the television broadcast of a sporting event.

In at least one embodiment, an automated video highlights and associated metadata generation application may receive a live broadcast audiovisual stream, or a digital audiovisual stream received via a computer server. The application may then process audio data, such as an audio stream extracted from the audiovisual stream, for example using digital signal processing techniques, to detect crowd noise such as, for example, crowd cheering.

In alternative embodiments, the techniques described herein can be applied to other types of source content. For example, the audio data need not be extracted from an audiovisual stream; rather it may be a radio broadcast or other audio depiction of a sporting event or other event. Alternatively, techniques described herein can be applied to stored audio data depicting an event; such data may or may not be extracted from stored audiovisual data.

Interactive television applications enable timely, relevant presentation of highlighted television programming content to users watching television programming either on a primary television display, or on a secondary display such as tablet, laptop or a smartphone. In at least one embodiment, a set of clips representing television broadcast content highlights is generated and/or stored in real-time, along with a database containing time-based metadata describing, in more detail, the events presented by the highlight clips. As described in more detail herein, the start and/or end times of such clips can be determined, at least in part, based on analysis of the extracted audio data.

In various embodiments, the metadata accompanying clips can be any information such as textual information, images, and/or any type of audiovisual data. One type of metadata associated with both in-game and post-game video content highlights present events detected by real-time processing of audio data extracted from sporting event television programming. In various embodiments, the system and method described herein enable automatic metadata generation and video highlight processing, wherein the start and/or end times of highlights can be detected and determined by analyzing digital audio data such an audio stream. For example, event information can be extracted by analyzing such audio data to detect cheering crowd noise following certain exciting events, audio announcements, music, and/or the like, and such information can be used to determine start and/or end times of highlights.

In at least one embodiment, real-time processing is performed on audio data, such as an audio stream extracted from sporting event television programming content, so as to detect, select, and track pronounced crowd noise (such as audience cheering).

In at least one embodiment, the system and method receive compressed audio data and read, decode, and resample the compressed audio data to a desired sampling rate. Pre-filtering may be performed for noise reduction, click removal, and selection of frequency band of interest; any of a number of interchangeable digital filtering stages can be used.

A spectrogram may be constructed for the audio data; pronounced collections of spectral magnitude peaks may be identified at each position of a sliding two-dimensional time-frequency area window.

A spectral indicator may be generated for each analysis window position, and a vector of spectral indicators with associated time positions may be formed.

Runs of selected indicator-position pairs with narrow time spacing may be identified and captured into a set of vectors R ∈ {R0, R1, . . . , Rn}. A vector E={R0, R1, . . . , Rn} may be formed, with the set of Rs as its elements. Since each R contains a variable count of indicators of non-equal size, they may be internally sorted by indicator value, to obtain maximum magnitude indicator.

Time position (start/median), and length (duration) of the run (count of the indicator-position pairs) may be extracted from each R vector.

A preliminary event vector may be formed, replacing each R vector with parameter triplets (M, P, D), representing maximum indicator value, start/median time position, and run length (duration), respectively.

The preliminary event vector may be processed to generate final crowd-noise event vector in accordance to desired event intervals, event loudness, and event duration.

The extracted crowd noise event information may automatically be appended to sporting event metadata associated with the sporting event video highlights.

In another embodiment, a system and method carry out real-time processing of an audio stream extracted from sporting event television programming for detecting, selecting, and tracking of pronounced crowd noise. The system and method may include capturing television programming content, extracting and processing digital audio data, such as a digital audio stream, to detect pronounced crowd noise events, generating a time-frequency audio spectrogram, performing joined time-frequency analysis of the audio data to detect areas of high spectral activity, generating spectral indicators for overlapping spectrogram areas, forming a vector of selected indicator-position pairs, identifying runs of selected indicator-position pairs with narrow time spacing, forming a set of vectors with the identified runs, forming at least one preliminary event vector with parameter triplets (M, P, D) derived from each run of selected indicator-position pairs, and revising the at least one preliminary event vector to generate at least one final crowd-noise event vector with desired event intervals, event loudness, and event duration.

Initial pre-processing of the decoded audio data may be performed for at least one of noise reduction, removal of clicks and other spurious sounds, and selection of frequency band of interest with a choice of interchangeable digital filtering stages.

A spectrogram may be constructed for the analysis of the audio data in a spectral domain. In at least one embodiment, a size of an analysis window is selected, together with a size of an analysis window overlap region. In at least one embodiment, the analysis window is slid along the spectrogram; at each analysis window position, a normalized average magnitude for the analysis window is computed. In at least one embodiment, an average magnitude is determined as a spectral indicator at each analysis window position. In at least one embodiment, an initial event vector is populated with computed pairs of an analysis window indicator and an associated position. In at least one embodiment, initial event vector indicators are subject to thresholding to retain only indicator-position pairs with an indicator above the threshold.

Each run may contain a variable count of indicators of non-equal size. In at least one embodiment, for each run, indicators are internally sorted by indicator value to obtain a maximum magnitude indicator.

For each run, a start/median time position and run duration may be extracted.

A preliminary event vector may be formed with parameter triplets (M, P, D). In at least one embodiment, triplets (M, P, D) represent maximum indicator value, start/median time position, and run duration, respectively.

A preliminary event vector may be revised to generate a final crowd-noise event vector in accordance to desired event intervals, event loudness, and event duration. In various embodiments, the preliminary event vector is revised by acceptable event distance selection, acceptable event duration selection, and/or acceptable event loudness selection.

The crowd noise event information may be further processed and automatically appended to metadata associated with the sporting event television programming highlights.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box (STB), game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Referring now to FIG. 1A, there is shown a block diagram depicting hardware architecture of a system 100 for automatically extracting metadata based on audio data of an event, according to a client/server embodiment. Event content, such as an audiovisual stream including audio content, may be provided via a network-connected content provider 124. An example of such a client/server embodiment is a web-based implementation, wherein each of one or more client devices 106 runs a browser or app that provides a user interface for interacting with content from various servers 102, 114, 116, including data provider(s) servers 122, and/or content provider(s) servers 124, via communications network 104. Transmission of content and/or data in response to requests from client device 106 can take place using any known protocols and languages, such as Hypertext Markup Language (HTML), Java, Objective C, Python, JavaScript, and/or the like.

Client device 106 can be any electronic device, such as a desktop computer, laptop computer, television, smartphone, tablet, music player, audio device, kiosk, set-top box, game system, wearable device, consumer electronic device, and/or the like. In at least one embodiment, client device 106 has a number of hardware components well known to those skilled in the art. Input device(s) 151 can be any component(s) that receive input from user 150, including, for example, a handheld remote control, keyboard, mouse, stylus, touch-sensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 152 can be any component that graphically displays information, video, content, and/or the like, including depictions of events, highlights, and/or the like. Such output may also include, for example, audiovisual content, data visualizations, navigational elements, graphical elements, queries requesting information and/or parameters for selection of content, or the like. In at least one embodiment, where only some of the desired output is presented at a time, a dynamic control, such as a scrolling mechanism, may be available via input device(s) 151 to choose which information is currently displayed, and/or to alter the manner in which the information is displayed.

Processor 157 can be a conventional microprocessor for performing operations on data under the direction of software, according to well-known techniques. Memory 156 can be random-access memory, having a structure and architecture as are known in the art, for use by processor 157 in the course of running software for performing the operations described herein. Client device 106 can also include local storage (not shown), which may be a hard drive, flash drive, optical or magnetic storage device, web-based (cloud-based) storage, and/or the like.

Any suitable type of communications network 104, such as the Internet, a television network, a cable network, a cellular network, and/or the like can be used as the mechanism for transmitting data between client device 106 and various server(s) 102, 114, 116 and/or content provider(s) 124 and/or data provider(s) 122, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 106 transmits requests for data and/or content via communications network 104, and receives responses from server(s) 102, 114, 116 containing the requested data and/or content.

In at least one embodiment, the system of FIG. 1A operates in connection with sporting events; however, the teachings herein apply to non-sporting events as well, and it is to be appreciated that the technology described herein is not limited to application to sporting events. For example, the technology described herein can be utilized to operate in connection with a television show, movie, news event, game show, political action, business show, drama, and/or other episodic content, or for more than one such event.

In at least one embodiment, system 100 identifies highlights of a broadcast event by analyzing audio content representing the event. This analysis may be carried out in real-time. In at least one embodiment, system 100 includes one or more web server(s) 102 coupled via a communications network 104 to one or more client devices 106. Communications network 104 may be a public network, a private network, or a combination of public and private networks such as the Internet. Communications network 104 can be a LAN, WAN, wired, wireless and/or combination of the above. Client device 106 is, in at least one embodiment, capable of connecting to communications network 104, either via a wired or wireless connection. In at least one embodiment, client device may also include a recording device capable of receiving and recording events, such as a DVR, PVR, or other media recording device. Such recording device can be part of client device 106, or can be external; in other embodiments, such recording device can be omitted. Although FIG. 1A shows one client device 106, system 100 can be implemented with any number of client device(s) 106 of a single type or multiple types.

Web server(s) 102 may include one or more physical computing devices and/or software that can receive requests from client device(s) 106 and respond to those requests with data, as well as send out unsolicited alerts and other messages. Web server(s) 102 may employ various strategies for fault tolerance and scalability such as load balancing, caching and clustering. In at least one embodiment, web server(s) 102 may include caching technology, as known in the art, for storing client requests and information related to events.

Web server(s) 102 may maintain, or otherwise designate, one or more application server(s) 114 to respond to requests received from client device(s) 106. In at least one embodiment, application server(s) 114 provide access to business logic for use by client application programs in client device(s) 106. Application server(s) 114 may be co-located, co-owned, or co-managed with web server(s) 102. Application server(s) 114 may also be remote from web server(s) 102. In at least one embodiment, application server(s) 114 interact with one or more analytical server(s) 116 and one or more data server(s) 118 to perform one or more operations of the disclosed technology.

One or more storage devices 153 may act as a "data store" by storing data pertinent to operation of system 100. This data may include, for example, and not by way of limitation, audio data 154 representing one or more audio signals. Audio data 154 may, for example, be extracted from audiovisual streams or stored audiovisual content representing sporting events and/or other events.

Audio data 154 can include any information related to audio embedded in the audiovisual stream, such as an audio stream that accompanies video imagery, processed versions of the audiovisual stream, and metrics and/or vectors related to audio data 154, such as time indices, durations, magnitudes, and/or other parameters of events. User data 155 can include any information describing one or more users 150, including for example, demographics, purchasing behavior, audiovisual stream viewing behavior, interests, preferences, and/or the like. Highlight data 164 may include highlights, highlight identifiers, time indicators, categories, excitement levels, and other data pertaining to highlights. Audio data 154, user data 155, and highlight data 164 will be described in detail subsequently.

Notably, many components of system 100 may be, or may include, computing devices. Such computing devices may each have an architecture similar to that of client device 106, as shown and described above. Thus, any of communications network 104, web servers 102, application servers 114, analytical servers 116, data providers 122, content providers 124, data servers 118, and storage devices 153 may include one or more computing devices, each of which may optionally have an input device 151, display screen 152, memory 156, and/or a processor 157, as described above in connection with client devices 106.

In an exemplary operation of system 100, one or more users 150 of client devices 106 view content from content providers 124, in the form of audiovisual streams. The audiovisual streams may show events, such as sporting events. The audiovisual streams may be digital audiovisual streams that can readily be processed with known computer vision techniques.

As the audiovisual streams are displayed, one or more components of system 100, such as client devices 106, web servers 102, application servers 114, and/or analytical servers 116, may analyze the audiovisual streams, identify highlights within the audiovisual streams, and/or extract metadata from the audiovisual stream, for example, from an audio component of the stream. This analysis may be carried out in response to receipt of a request to identify highlights and/or metadata for the audiovisual stream. Alternatively, in another embodiment, highlights and/or metadata may be identified without a specific request having been made by user 150. In yet another embodiment, the analysis of audiovisual streams can take place without an audiovisual stream being displayed.

In at least one embodiment, user 150 can specify, via input device(s) 151 at client device 106, certain parameters for analysis of audio data 154 (such as, for example, what event/games/teams to include, how much time user 150 has available to view the highlights, what metadata is desired, and/or any other parameters). User preferences can also be extracted from storage, such as from user data 155 stored in one or more storage devices 153, so as to customize analysis of audio data 154 without necessarily requiring user 150 to specify preferences. In at least one embodiment, user preferences can be determined based on observed behavior and actions of user 150, for example, by observing website visitation patterns, television watching patterns, music listening patterns, online purchases, previous highlight identification parameters, highlights and/or metadata actually viewed by user 150, and/or the like.

Additionally or alternatively, user preferences can be retrieved from previously stored preferences that were explicitly provided by user 150. Such user preferences may indicate which teams, sports, players, and/or types of events are of interest to user 150, and/or they may indicate what type of metadata or other information related to highlights, would be of interest to user 150. Such preferences can therefore be used to guide analysis of the audiovisual stream to identify highlights and/or extract metadata for the highlights.

Analytical server(s) 116, which may include one or more computing devices as described above, may analyze live and/or recorded feeds of play-by-play statistics related to one or more events from data provider(s) 122. Examples of data provider(s) 122 may include, but are not limited to, providers of real-time sports information such as STATS™, Perform (available from Opta Sports of London, UK), and SportRadar of St. Gallen, Switzerland. In at least one embodiment, analytical server(s) 116 generate different sets of excitement levels for events; such excitement levels can then be stored in conjunction with highlights identified by or received by system 100 according to the techniques described herein.

Application server(s) 114 may analyze the audiovisual stream to identify the highlights and/or extract the metadata. Additionally or alternatively, such analysis may be carried out by client device(s) 106. The identified highlights and/or extracted metadata may be specific to a user 150; in such case, it may be advantageous to identify the highlights in client device 106 pertaining to a particular user 150. Client device 106 may receive, retain, and/or retrieve the applicable user preferences for highlight identification and/or metadata extraction, as described above. Additionally or alternatively, highlight generation and/or metadata extraction may be carried out globally (i.e., using objective criteria applicable to the user population in general, without regard to preferences for a particular user 150). In such a case, it may be advantageous to identify the highlights and/or extract the metadata in application server(s) 114.

Content that facilitates highlight identification, audio analysis, and/or metadata extraction may come from any suitable source, including from content provider(s) 124, which may include websites such as YouTube, MLB.com, and the like; sports data providers; television stations; client- or server-based DVRs; and/or the like. Alternatively, content can come from a local source such as a DVR or other recording device associated with (or built into) client device 106. In at least one embodiment, application server(s) 114 generate a customized highlight show, with highlights and metadata, available to user 150, either as a download, or streaming content, or on-demand content, or in some other manner.

As mentioned above, it may be advantageous for user-specific highlight identification, audio analysis, and/or metadata extraction to be carried out at a particular client device 106 associated with a particular user 150. Such an embodiment may avoid the need for video content or other high-bandwidth content to be transmitted via communications network 104 unnecessarily, particularly if such content is already available at client device 106.

Figure 1B:
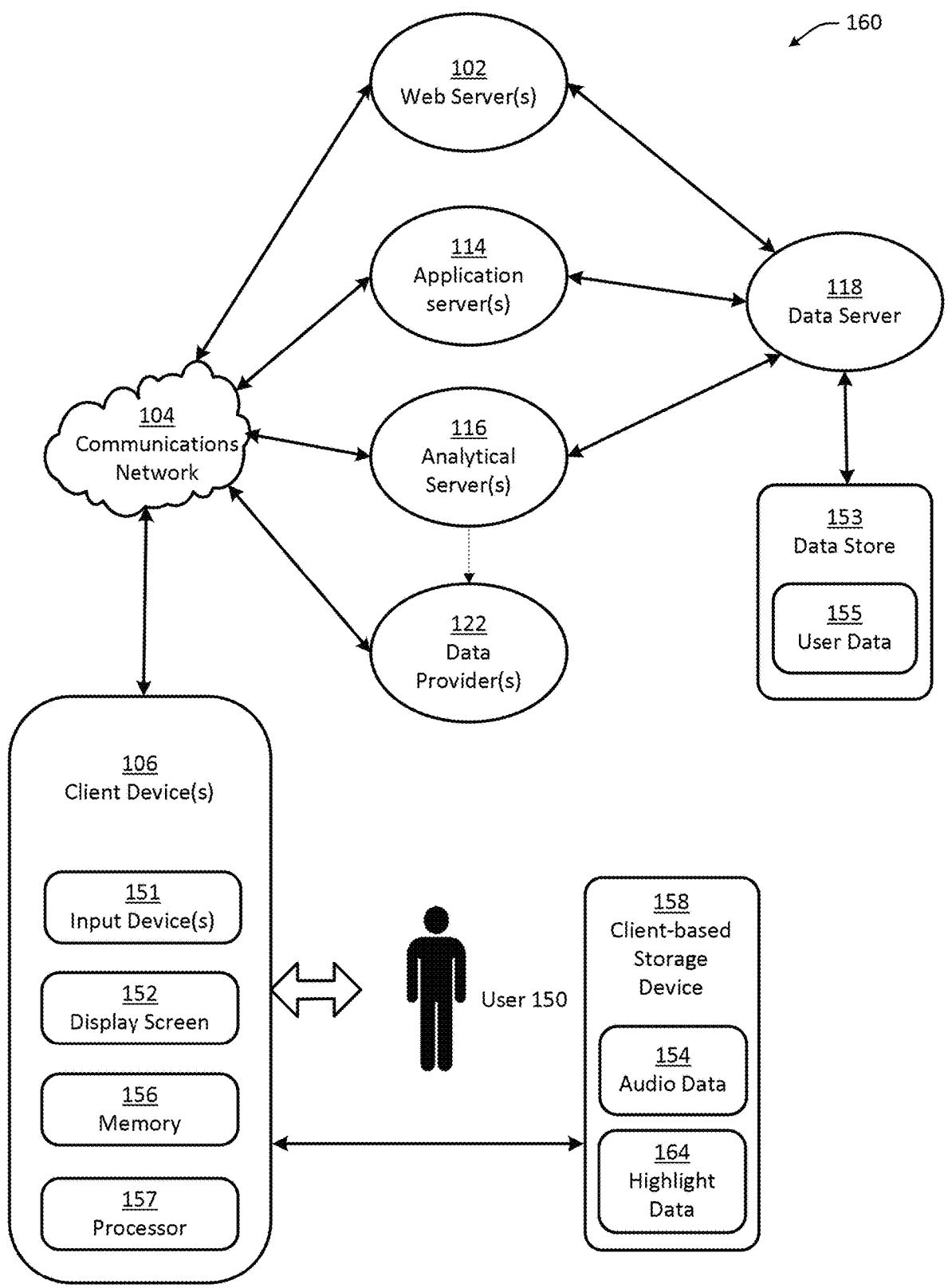
FIG. 1B is a block diagram depicting a hardware architecture according to another client/server embodiment, wherein event content is stored at a client-based storage device.

For example, referring now to FIG. 1B, there is shown an example of a system 160 according to an embodiment wherein at least some of audio data 154 and highlight data 164 are stored at client-based storage device 158, which may be any form of local storage device available to client device 106. An example is a DVR on which events may be recorded, such as for example video content for a complete sporting event. Alternatively, client-based storage device 158 can be any magnetic, optical, or electronic storage device for data in digital form; examples include flash memory, magnetic hard drive, CD-ROM, DVD-ROM, or other device integrated with client device 106 or communicatively coupled with client device 106. Based on the information provided by application server(s) 114, client device 106 may extract metadata from audio data 154 stored at client-based storage device 158 and store the metadata as highlight data 164 without having to retrieve other content from a content provider 124 or other remote source. Such an arrangement can save bandwidth, and can usefully leverage existing hardware that may already be available to client device 106.

Returning to FIG. 1A, in at least one embodiment, application server(s) 114 may identify different highlights and/or extract different metadata for different users 150, depending on individual user preferences and/or other parameters. The identified highlights and/or extracted metadata may be presented to user 150 via any suitable output device, such as display screen 152 at client device 106. If desired, multiple highlights may be identified and compiled into a highlight show, along with associated metadata. Such a highlight show may be accessed via a menu, and/or assembled into a "highlight reel," or set of highlights, that plays for user 150 according to a predetermined sequence. User 150 can, in at least one embodiment, control highlight playback and/or delivery of the associated metadata via input device(s) 151, for example to:

select particular highlights and/or metadata for display;
pause, rewind, fast-forward;
skip forward to the next highlight;
return to the beginning of a previous highlight within the highlight show; and/or
perform other actions.

Additional details on such functionality are provided in the above-cited related U.S. patent applications.

In at least one embodiment, one or more data server(s) 118 are provided. Data server(s) 118 may respond to requests for data from any of server(s) 102, 114, 116, for example to obtain or provide audio data 154, user data 155, and/or highlight data 164. In at least one embodiment, such information can be stored at any suitable storage device 153 accessible by data server 118, and can come from any suitable source, such as from client device 106 itself, content provider(s) 124, data provider(s) 122, and/or the like.

Figure 1C:
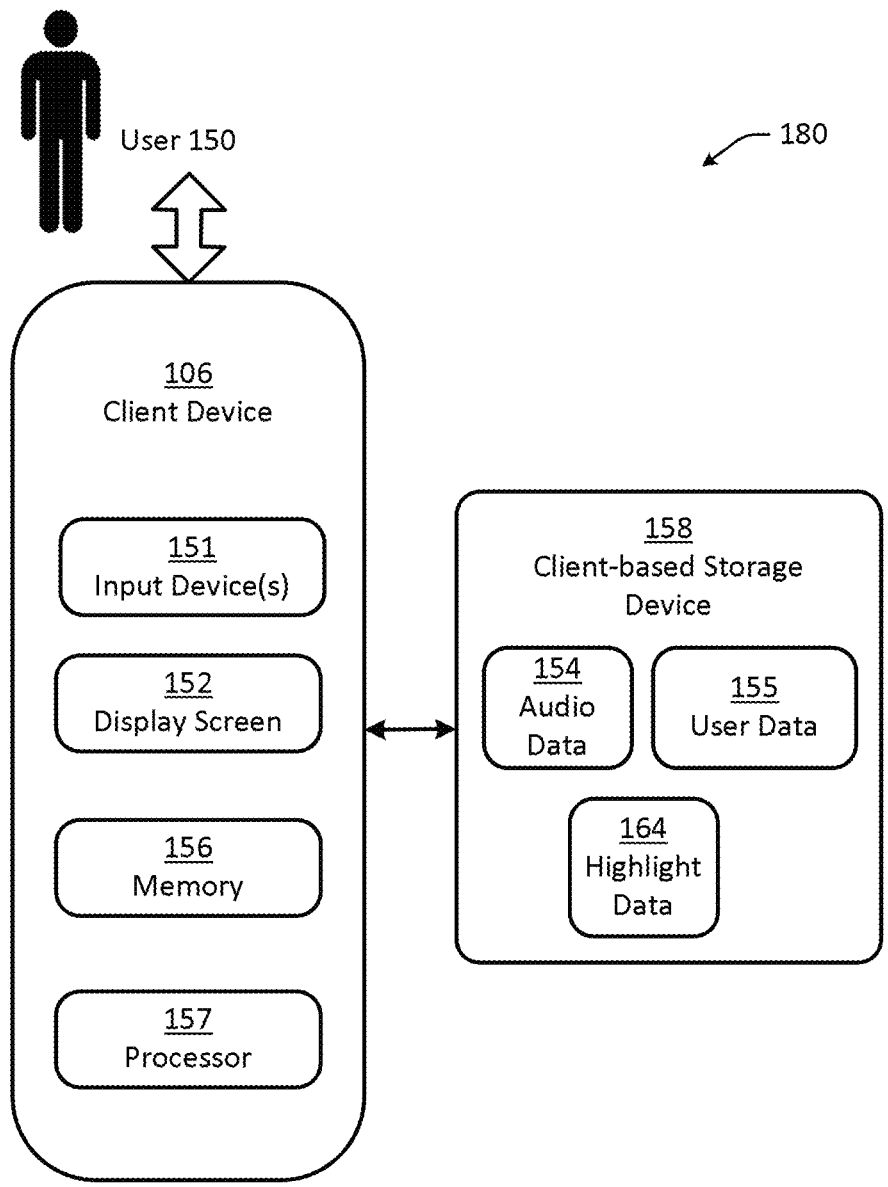
FIG. 1C is a block diagram depicting a hardware architecture according to a standalone embodiment.

Referring now to FIG. 1C, there is shown a system 180 according to an alternative embodiment wherein system 180 is implemented in a stand-alone environment. As with the embodiment shown in FIG. 1B, at least some of audio data 154, user data 155, and highlight data 164 may be stored at a client-based storage device 158, such as a DVR or the like. Alternatively, client-based storage device 158 can be flash memory or a hard drive, or other device integrated with client device 106 or communicatively coupled with client device 106.

User data 155 may include preferences and interests of user 150. Based on such user data 155, system 180 may extract metadata within audio data 154 to present to user 150 in the manner described herein. Additionally or alternatively, metadata may be extracted based on objective criteria that are not based on information specific to user 150.

Figure 1D:
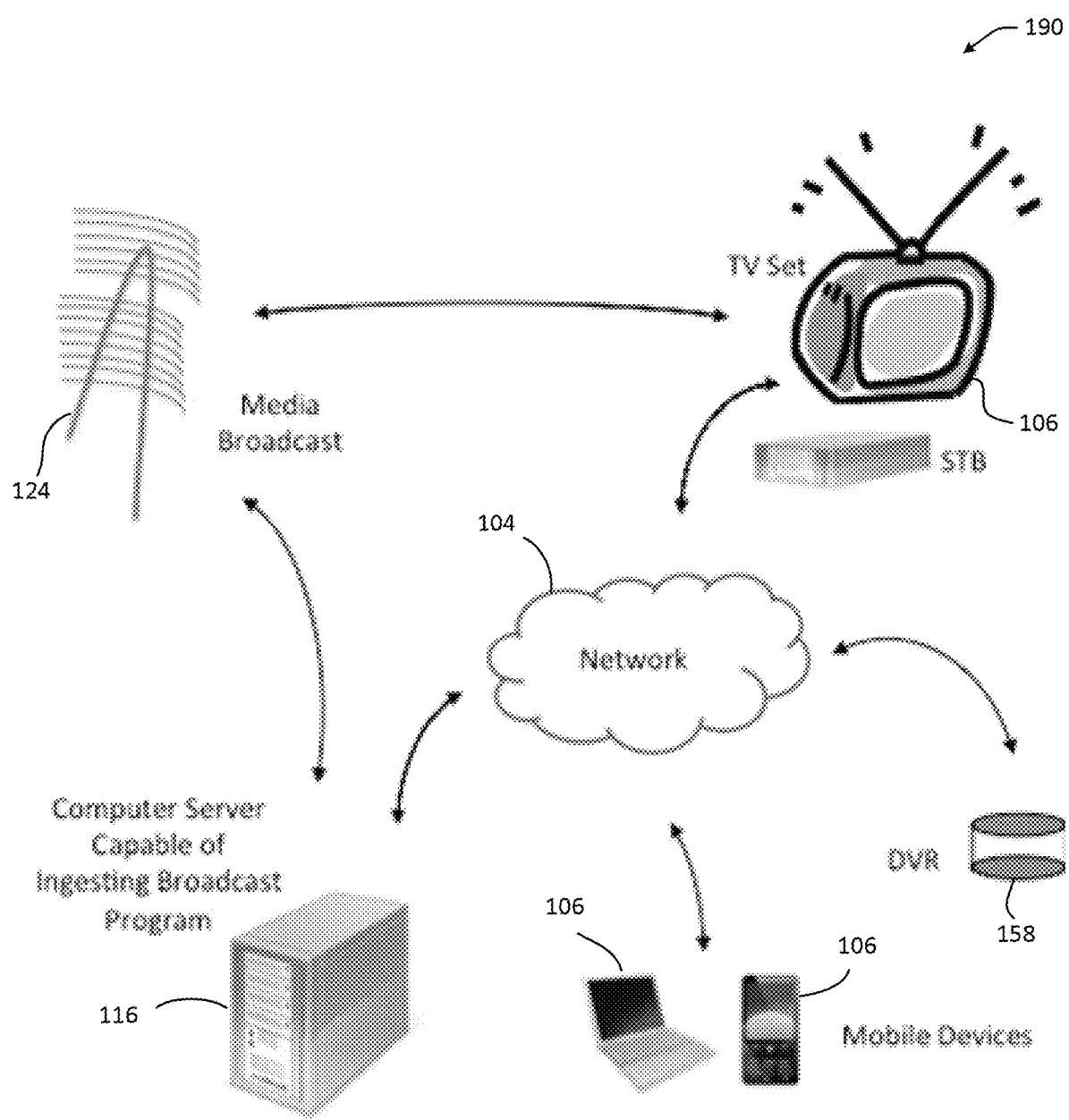
FIG. 1D is a block diagram depicting an overview of a system architecture, according to one embodiment.

Referring now to FIG. 1D, there is shown an overview of a system 190 with architecture according to an alternative embodiment. In FIG. 1D, system 190 includes a broadcast service such as content provider(s) 124, a content receiver in the form of client device 106 such as a television set with a STB, a video server such as analytical server(s) 116 capable of ingesting and streaming television programming content, and/or other client devices 106 such as a mobile device and a laptop, which are capable of receiving and processing television programming content, all connected via a network such as communications network 104. A client-based storage device 158, such as a DVR, may be connected to any of client devices 106 and/or other components, and may store an audiovisual stream, highlights, highlight identifiers, and/or metadata to facilitate identification and presentation of highlights and/or extracted metadata via any of client devices 106.

The specific hardware architectures depicted in FIGS. 1A, 1B, 1C, and 1D are merely exemplary. One skilled in the art will recognize that the techniques described herein can be implemented using other architectures. Many components depicted therein are optional and may be omitted, consolidated with other components, and/or replaced with other components.

In at least one embodiment, the system can be implemented as software written in any suitable computer programming language, whether in a standalone or client/server architecture. Alternatively, it may be implemented and/or embedded in hardware.

Data Structures

Figure 2:
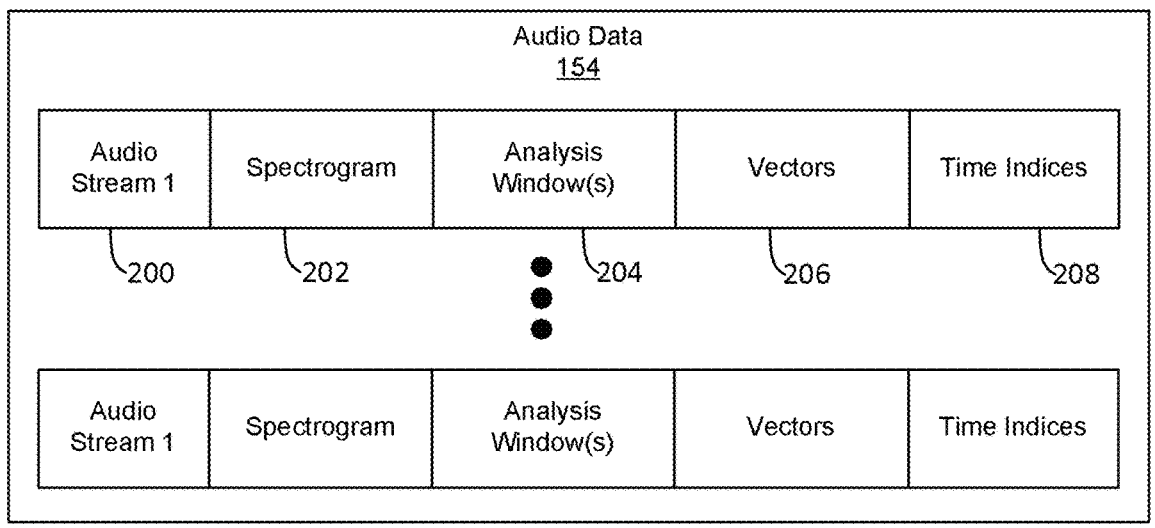
FIG. 2 is a schematic block diagram depicting examples of data structures that may be incorporated into the audio data, user data, and highlight data of FIGS. 1A, B, and 1C, according to one embodiment.
Figure 2:
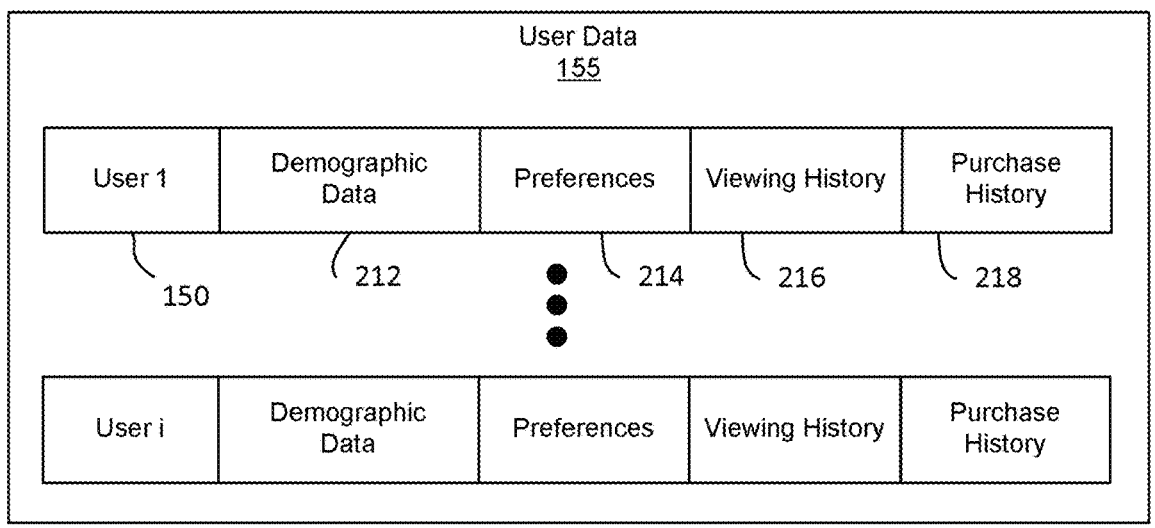
Figure 2:
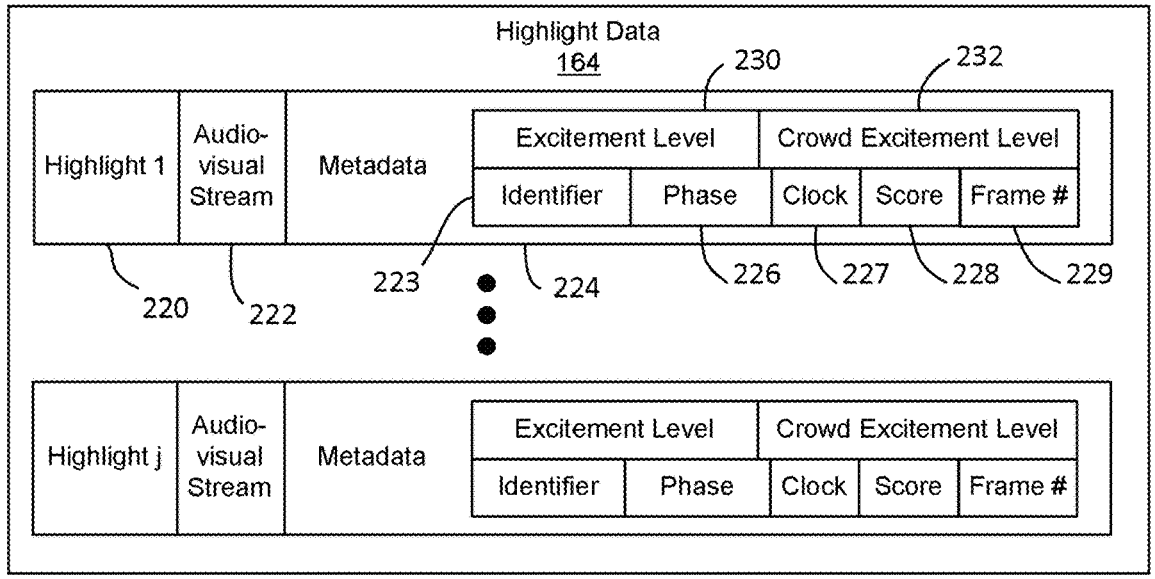

FIG. 2 is a schematic block diagram depicting examples of data structures that may be incorporated into audio data 154, user data 155, and highlight data 164, according to one embodiment.

As shown, audio data 154 may include a record for each of a plurality of audio streams 200. For illustrative purposes, audio streams 200 are depicted, although the techniques described herein can be applied to any type of audio data 154 or content, whether streamed or stored. The records of audio data 154 may include, in addition to the audio streams 200, other data produced pursuant to, or helpful for, analysis of the audio streams 200. For example, audio data 154 may include, for each audio stream 200, a spectrogram 202, one or more analysis windows 204, vectors 206, and time indices 208.

Each audio stream 200 may reside in the time domain. Each spectrogram 202 may computed for the corresponding audio stream 200 in the time-frequency domain. Spectrogram 202 may be analyzed to more easily locate audio events of the desired frequency, such as crowd noise.

Analysis windows 204 may be designations of predetermined time and/or frequency intervals of the spectrograms 202. Computationally, a single moving (i.e., "sliding") analysis window 204 may be used to analyze a spectrogram 202, or a series of displaced (optionally overlapping) analysis windows 204 may be used.

Vectors 206 may be data sets containing interim and/or final results from analysis of audio stream 200 and/or corresponding spectrogram 202.

Time indices 208 may indicate times, within audio stream 200 (and/or the audiovisual stream from which audio stream 200 is extracted) at which key events occur. For example, time indices 208 may be the times, within a broadcast, at which crowd noise builds or reduces. Thus, time indices 208 may indicate the beginning or end of a particularly interesting part of the audiovisual stream, such as, in the context of a sporting event, an important or impressive play.

As further shown, user data 155 may include records pertaining to users 150, each of which may include demographic data 212, preferences 214, viewing history 216, and purchase history 218 for a particular user 150.

Demographic data 212 may include any type of demographic data, including but not limited to age, gender, location, nationality, religious affiliation, education level, and/or the like.

Preferences 214 may include selections made by user 150 regarding his or her preferences. Preferences 214 may relate directly to highlight and metadata gathering and/or viewing, or may be more general in nature. In either case, preferences 214 may be used to facilitate identification and/or presentation of the highlights and metadata to user 150.

Viewing history 216 may list television programs, audiovisual streams, highlights, web pages, search queries, sporting events, and/or other content retrieved and/or viewed by user 150.

Purchase history 218 may list products or services purchased or requested by user 150.

As further shown, highlight data 164 may include records for j highlights 220, each of which may include an audiovisual stream 222 and/or metadata 224 for a particular highlight 220.

Audiovisual stream 222 may include video depicting highlight 220, which may be obtained from one or more audiovisual streams of one or more events (for example, by cropping the audiovisual stream to include only audiovisual stream 222 pertaining to highlight 220). Within metadata 224, identifier 223 may include time indices (such as time indices 208 of audio data 154) and/or other indicia that indicate where highlight 220 resides within the audiovisual stream of the event from which it is obtained.

In some embodiments, the record for each of highlights 220 may contain only one of audiovisual stream 222 and identifier 223. Highlight playback may be carried out by playing audiovisual stream 222 for user 150, or by using identifier 223 to play only the highlighted portion of the audiovisual stream for the event from which highlight 220 is obtained. Storage of identifier 223 is optional; in some embodiments, identifier 223 may only be used to extract audiovisual stream 222 for highlight 220, which may then be stored in place of identifier 223. In either case, time indices 208 for highlight 220 may be extracted from audio data 154 and stored, at least temporarily, as metadata 224 that is either appended to highlight 220, or to the audiovisual stream from which audio data 154 and highlight 220 are obtained.

In addition to or in the alternative to identifier 223, metadata 224 may include information about highlight 220, such as the event date, season, and groups or individuals involved in the event or the audiovisual stream from which highlight 220 was obtained, such as teams, players, coaches, anchors, broadcasters, and fans, and/or the like. Among other information, metadata 224 for each highlight 220 may include a phase 226, clock 227, score 228, a frame number 229, an excitement level 230, and/or a crowd excitement level 232.

Phase 226 may be the phase of the event pertaining to highlight 220. More particularly, phase 226 may be the stage of a sporting event in which the start, middle, and/or end of highlight 220 resides. For example, phase 226 may be "third quarter," "second inning," "bottom half," or the like.

Clock 227 may be the game clock pertaining to highlight 220. More particularly, clock 227 may be state of the game clock at the start, middle, and/or end of highlight 220. For example, clock 227 may be "15:47" for a highlight 220 that begins, ends, or straddles the period of a sporting event at which fifteen minutes and forty-seven seconds are displayed on the game clock.

Score 228 may be the game score pertaining to highlight 220. More particularly, score 228 may be the score at the beginning, end, and/or middle of highlight 220. For example, score 228 may be "45-38," "7-0," "30-love," or the like.

Frame number 229 may be the number of the video frame, within the audiovisual stream from which highlight 220 is obtained, or audiovisual stream 222 pertaining to highlight 220, that relates to the start, middle, and/or end of highlight 220.

Excitement level 230 may be a measure of how exciting or interesting an event or highlight is expected to be for a particular user 150, or for users in general. In at least one embodiment, excitement level 230 may be computed as indicated in the above-referenced related applications. Additionally or alternatively, excitement level 230 may be determined, at least in part, by analysis of audio data 154, which may be a component that is extracted from audiovisual stream 222 and/or audio stream 200. For example, audio data 154 that contains higher levels of crowd noise, announcements, and/or up-tempo music may be indicative of a high excitement level 230 for associated highlight 220. Excitement level 230 need not be static for a highlight 220, but may instead change over the course of highlight 220. Thus, system 100 may be able to further refine highlights 220 to show a user only portions that are above a threshold excitement level 230.

Crowd excitement level 232 may be a measure of how excited the crowd attending an event seems to be. In at least one embodiment, crowd excitement level 232 may be determined based on analysis of audio data 154. In other embodiments, visual analysis may be used to gauge crowd excitement, or to supplement the results of the audio data analysis.

For example, if intense crowd noise is detected by analysis of audio stream 200 for a highlight 220, crowd excitement level 232 for the highlight 220 may be deemed relatively high. Like excitement level 230, crowd excitement level 232 may change over the course of a highlight 220; thus, crowd excitement level 232 may include multiple indicators that correspond, for example, to specific times within highlight 220.

The data structures set forth in FIG. 2 are merely exemplary. Those of skill in the art will recognize that some of the data of FIG. 2 may be omitted or replaced with other data in the performance of highlight identification and/or metadata extraction. Additionally or alternatively, data not specifically shown in FIG. 2 or described in this application may be used in the performance of highlight identification and/or metadata extraction.

Audio Data 154

In at least one embodiment, the system performs several stages of analysis of audio data 154, such as an audio stream, in the time-frequency domain, so as to detect crowd noise such as crowd cheering, chanting, and fan support, during a depiction of a sporting event or another event. The depiction may be a television broadcast, audiovisual stream, audio stream, stored file, and/or the like.

First, compressed audio data 154 is read, decoded, and resampled to a desired sampling rate. Next, the resulting PCM stream is pre-filtered for noise reduction, click removal, and/or selection of desired frequency band, using any of a number of interchangeable digital filtering stages. Subsequently, a spectrogram is constructed for audio data 154. Pronounced collections of spectral magnitude peaks are identified at each position of a sliding two-dimensional time-frequency area window. A spectral indicator is generated for each analysis window position, and a vector of spectral indicators with associated time positions is formed.

Next, runs of selected indicator-position pairs with narrow time spacing are identified and captured into a set of vectors R∈ {R0, R1, . . . , Rn}. A vector E={R0, R1, . . . , Rn} is formed, with the set of Rs as its elements. Since each R contains a variable count of indicators of non-equal size, they are further sorted by indicator value, to obtain maximum magnitude indicator for each R. In addition, a time position (start/median), and length (duration) of the run (count of the indicator-position pairs) are extracted from each R vector. A preliminary event vector is formed, replacing each R vector with parameter triplets (M, P, D), where M=maximum indicator value, P=start/median time position, and D=run length (duration). This preliminary event vector is then processed to generate a final crowd-noise event vector in accordance with desired event intervals, event loudness, and event duration. The extracted crowd noise event information is then automatically appended to sporting event metadata associated with the sporting event video highlights.

Figure 3A:
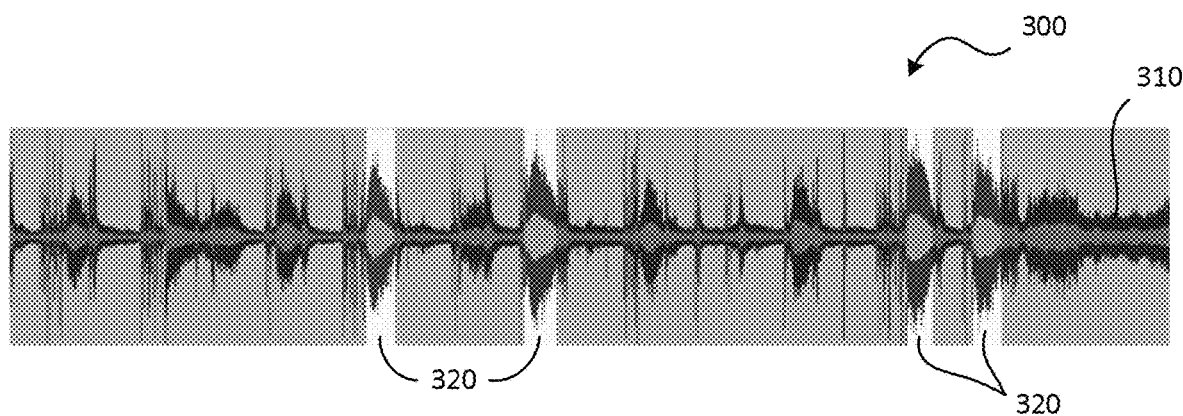
FIG. 3A depicts an example of an audio waveform graph showing occurrences of crowd noise events (e.g., crowd cheering) in an audio stream extracted from sporting event television programming content in a time domain, according to one embodiment.

FIG. 3A depicts an example of an audio waveform graph 300 in an audio stream 310 extracted from sporting event television programming content in a time domain, according to one embodiment. Highlighted areas 320 show exemplary noise events, such as crowd cheering. The amplitude of captured audio may be relatively high in highlighted areas 320, representing relatively loud portions of audio stream 310.

Figure 3B:
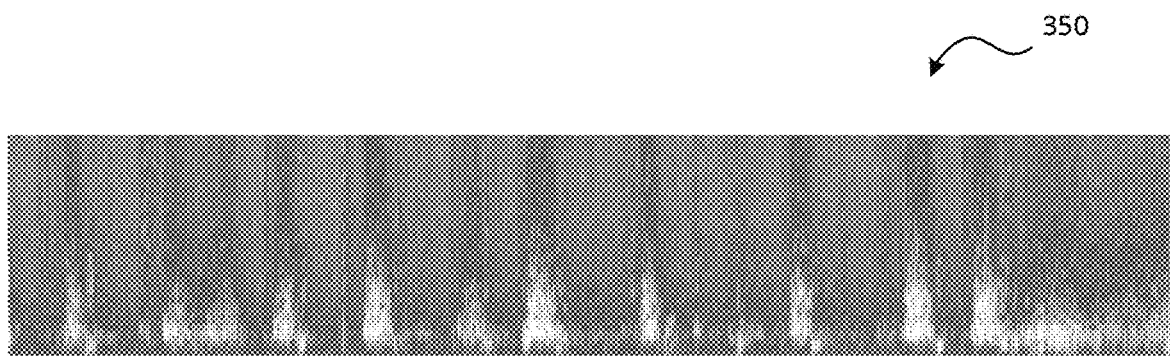
FIG. 3B depicts an example of a spectrogram corresponding to the audio waveform graph of FIG. 3A, in a time-frequency domain, according to one embodiment.

FIG. 3B depicts an example of a spectrogram 350 corresponding to audio waveform graph 300 of FIG. 3A, in a time-frequency domain, according to one embodiment. In at least one embodiment, detecting and marking of occurrences of events of interest is performed in the time-frequency domain, and timing boundaries for the event are presented in real-time to the video highlights and metadata generation application. This may enable generation of corresponding metadata 224, such identifiers 223 that identify the beginning and/or end of a highlight 220, a level of crowd excitement occurring during highlight 220, and/or the like.

Audio Data Analysis and Metadata Extraction

Figure 4:
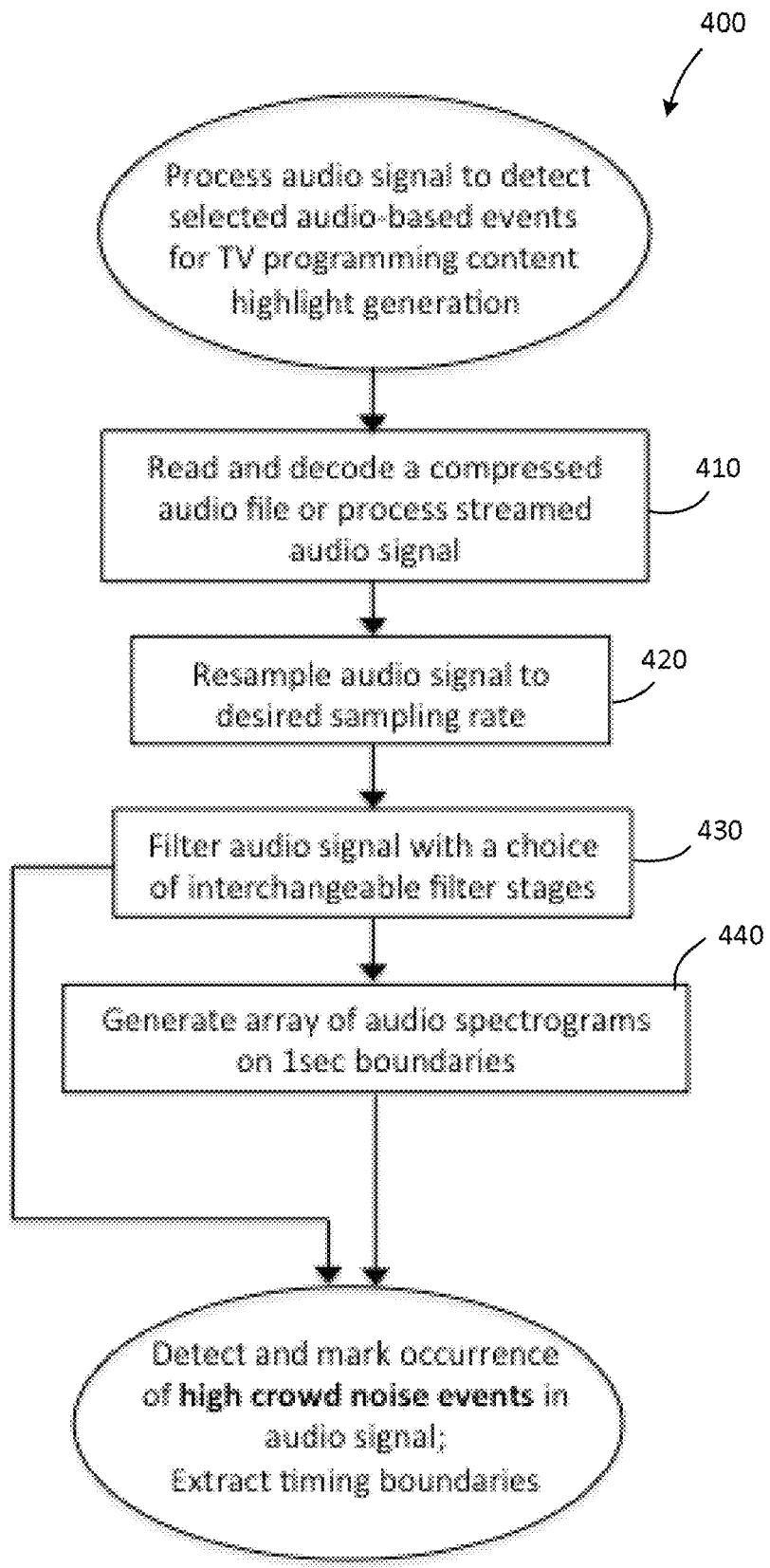
FIG. 4 is a flowchart depicting a method that performs on-the-fly processing of audio data for extraction of metadata, according to one embodiment.

FIG. 4 is a flowchart depicting a method 400 carried out by an application (for example, running on one of client devices 106 and/or analytical servers 116) that receives an audiovisual stream 222 and performs on-the-fly processing of audio data 154 for extraction of metadata 224, for example, corresponding to highlights 220, according to one embodiment. According to method 400, audio data 154 such as audio stream 310 may be processed to detect crowd noise audio events, music events, announcement events, and/or other audible events related to television programming content highlight generation.

In at least one embodiment, method 400 (and/or other methods described herein) is performed on audio data 154 that has been extracted from audiovisual stream or other audiovisual content. Alternatively, the techniques described herein can be applied to other types of source content. For example, audio data 154 need not be extracted from an audiovisual stream; rather it may be a radio broadcast or other audio depiction of a sporting event or other event.

In at least one embodiment, method 400 (and/or other methods described herein) may be performed by a system such as system 100 of FIG. 1A; however, alternative systems, including but not limited to system 160 of FIG. 1B, system 180 of FIG. 1C, and system 190 of FIG. 1D, may be used in place of system 100 of FIG. 1A. Further, the following description assumes that crowd noise events are to be identified; however, it will be understood that different types of audible events may be identified and used to extract metadata according to methods similar to those set forth herein.

Method 400 of FIG. 4 may commence with a step 410 in which audio data 154, such as an audio stream 200, is read; if audio data 154 is in a compressed format, it can optionally be decoded. In a step 420, audio data 154 may be resampled to a desired sampling rate. In a step 430, audio data 154 may be filtered using any of a number of interchangeable digital filtering stages. Next, in a step 440, a spectrogram 202 may optionally be generated for the filtered audio data 154, for example by computing a Short-time Fourier Transform (STFT) on one-second chunks of the filtered audio data 154. Spectrogram 202 time-frequency coefficients may be saved in a two-dimensional array for further processing.

Notably, in some embodiments, step 440 may be omitted. Rather than carrying out analysis of spectrogram 202, further analysis may be carried out directly on audio data 154. FIGS. 5 through 10 below assume that step 440 has been carried out, and that the remaining analysis steps are performed on spectrogram 202 corresponding to audio data 154 (for example, after decoding, resampling, and/or filtering audio data 154 as described above).

Figure 5:
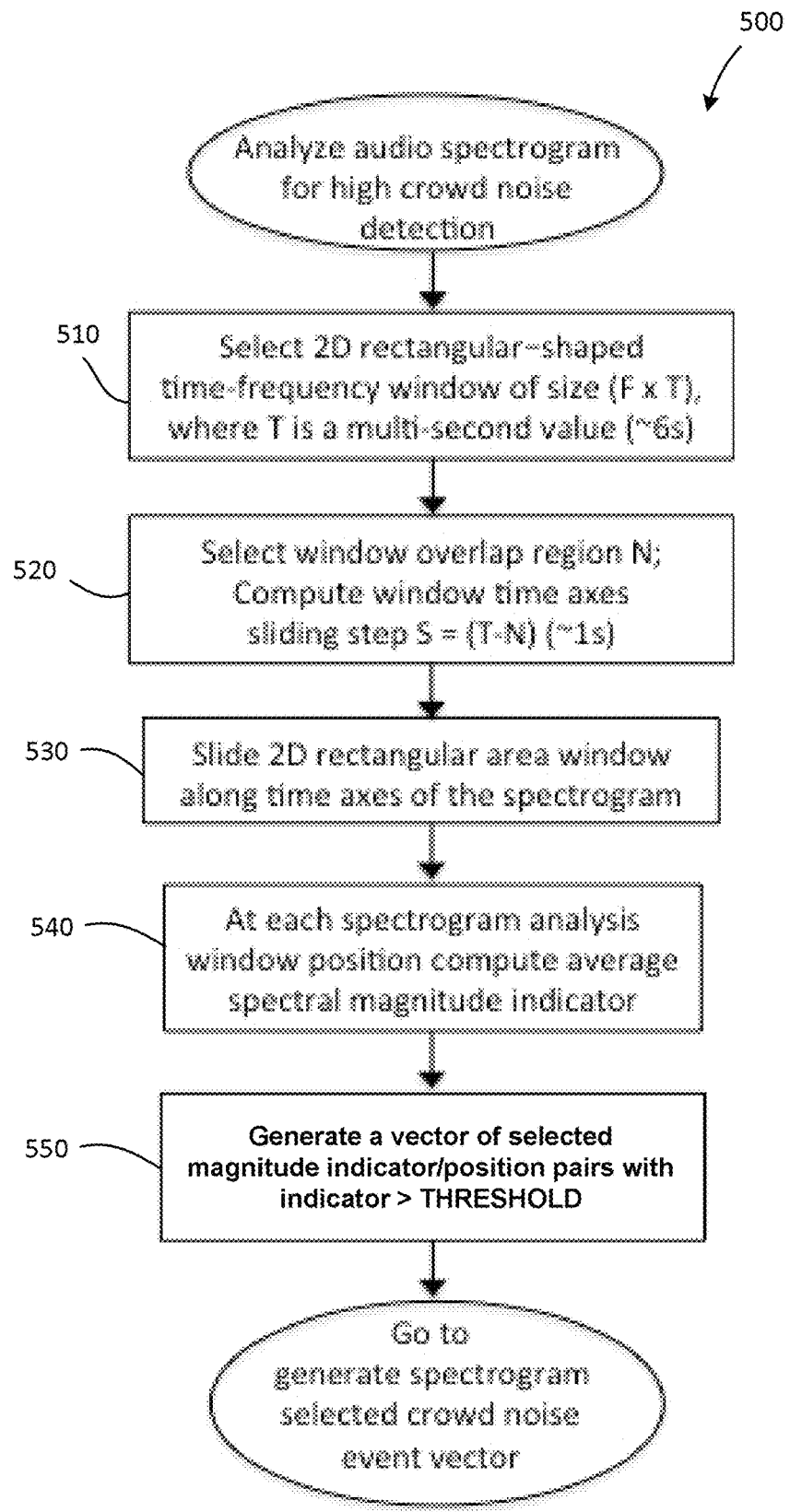
FIG. 5 is a flowchart depicting a method for analyzing the audio data in the time-frequency domain to detect clustering of spectral magnitude peaks pertinent to prolonged crowd cheering, according to one embodiment.

FIG. 5 is a flowchart depicting a method 500 for analyzing audio data 154, such as audio stream 200, in the time-frequency domain, for example, by analyzing spectrogram 202 to detect clustering of spectral magnitude peaks pertinent to prolonged crowd cheering (crowd noise), according to one embodiment. First, in a step 510, a two-dimensional rectangular-shaped time-frequency analysis window 204 of size (F×T) is selected, where T is a multi-second value (typically ~6 s), and F is frequency range to be considered (typically 500 Hz-3 KHz). Next, in a step 520, a window overlap region N is selected between adjacent analysis windows 204, and window sliding step S=(T−N) is computed (typically ~1 sec). The method proceeds to a step 530 in which analysis window 204 slides along the spectral time axis. In a step 540, at each position of analysis window 204, a normalized magnitude is computed, followed by calculation of an average peak magnitude for analysis window 204. The computed average spectral peak magnitude represents an event indicator associated with each position of analysis window 204. In a step 550, a threshold is applied to each indicator value, and an initial events vector of vectors 206 is generated containing indicator-position pairs as its elements.

As established above, the initial events vector may include a set of indicator-position pairs selected by thresholding in step 550. This vector may then be analyzed to identify dense groups of indicators with narrow positional spacing of adjacent elements. This process is illustrated in FIG. 6.

Figure 6:
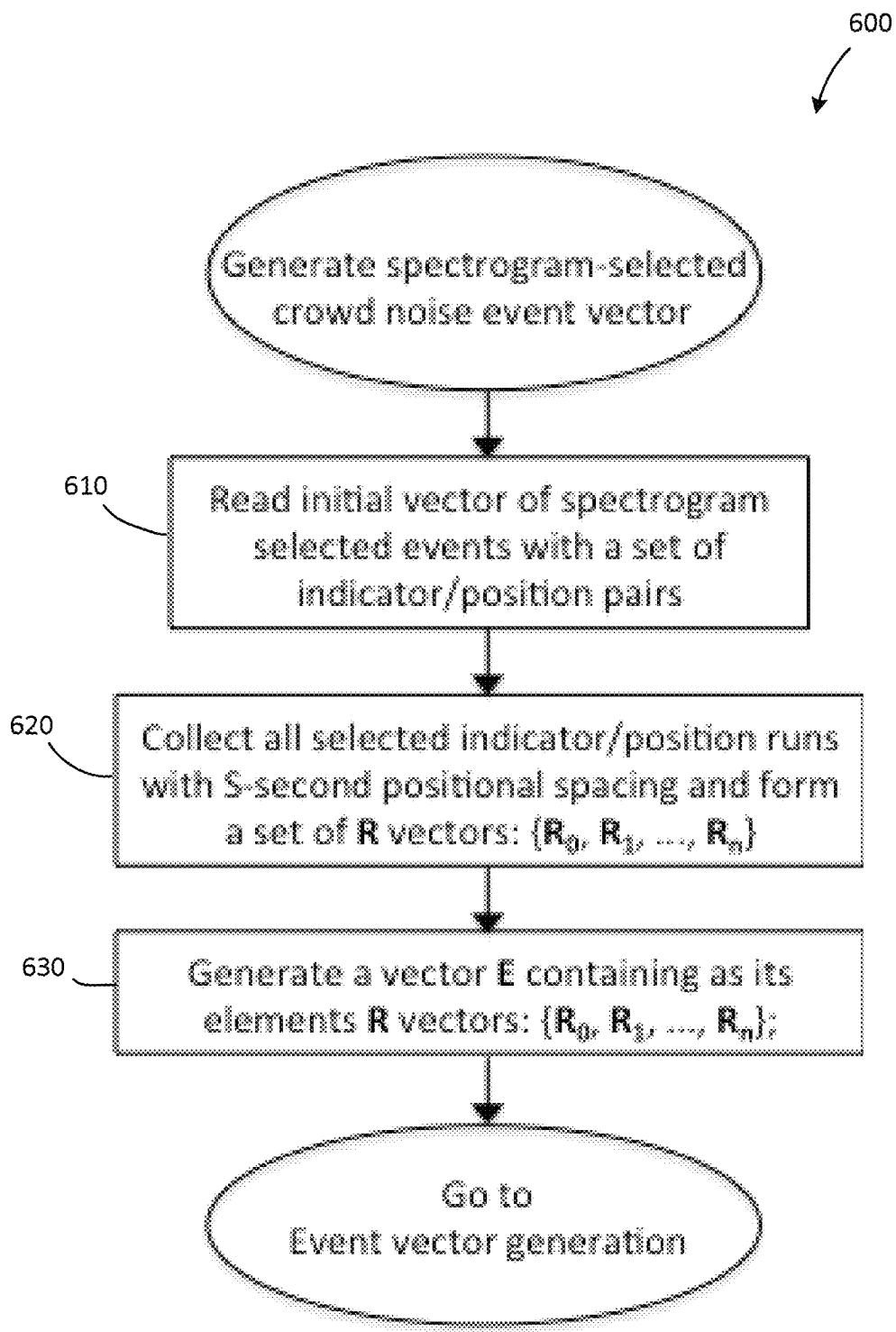
FIG. 6 is a flowchart depicting a method for generation of a crowd noise event vector, according to one embodiment.

FIG. 6 is a flowchart depicting a method 600 for generation of a crowd noise event vector, according to one embodiment. In a step 610, the initial vector of selected events may be read, with a set of indicator/position pairs. In a step 620, all selected indicator-position runs with S-second positional spacing of adjacent vector elements may be collected into a set of vectors R∈ {R0, R1, . . . , Rn}. In a step 630, a vector E={R0, R1, . . . , Rn} may be formed, with R vectors as its elements. Subsequently, each element R of vector E may be further analyzed to extract maximum indicator for the event, event time position, and/or event duration.

Figure 7:
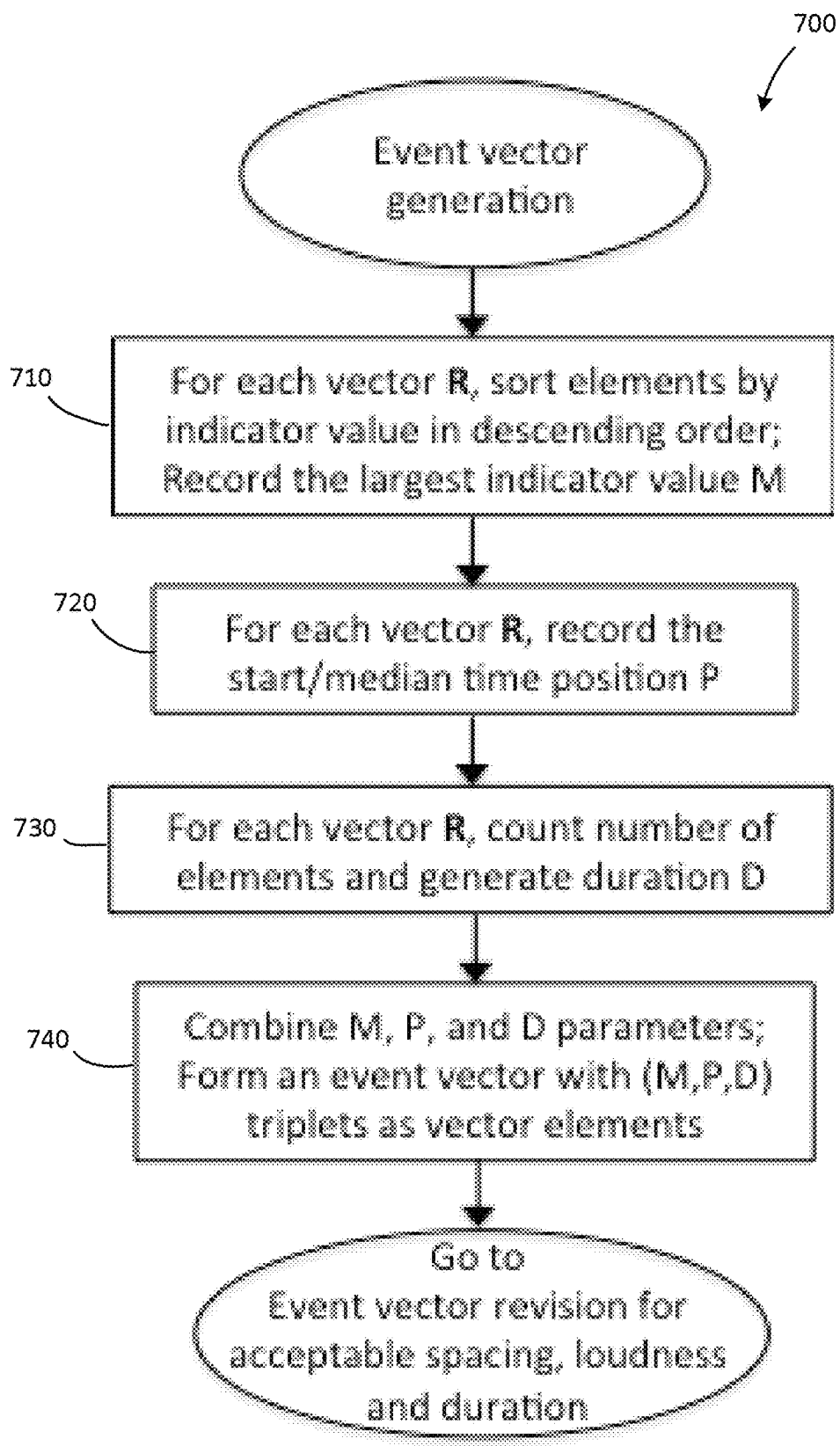
FIG. 7 is a flowchart depicting a method for internal processing of each R vector, according to one embodiment.

FIG. 7 is a flowchart depicting a method 700 for internal processing of each R vector, according to one embodiment. In a step 710, elements of R may be sorted by indicator value in descending order. The largest indicator values may be extracted as M parameters for the events. In a step 720, the start/median time may be recorded for each of the vectors R as a parameter P. In a step 730, for each vector R, the number of elements may be counted and recorded as duration parameter D for each vector R. A triplet (M, P, D) may be formed for each event, describing the event strength (loudness), starting/median position, and/or duration. These triplets may replace the R vectors as new derived elements, fully conveying the sought information about crowd noise events. As illustrated in the flowchart of FIG. 7, subsequent processing may include, in a step 740, combining the M, P, and D parameters for each R, and forming a new vector with (M, P, D) triplets as its elements. The event vector may be passed to the process for event spacing selection, event duration selection, and event loudness (magnitude indicator) selection, to form a final timeline of detected crowd noise events.

Figure 8:
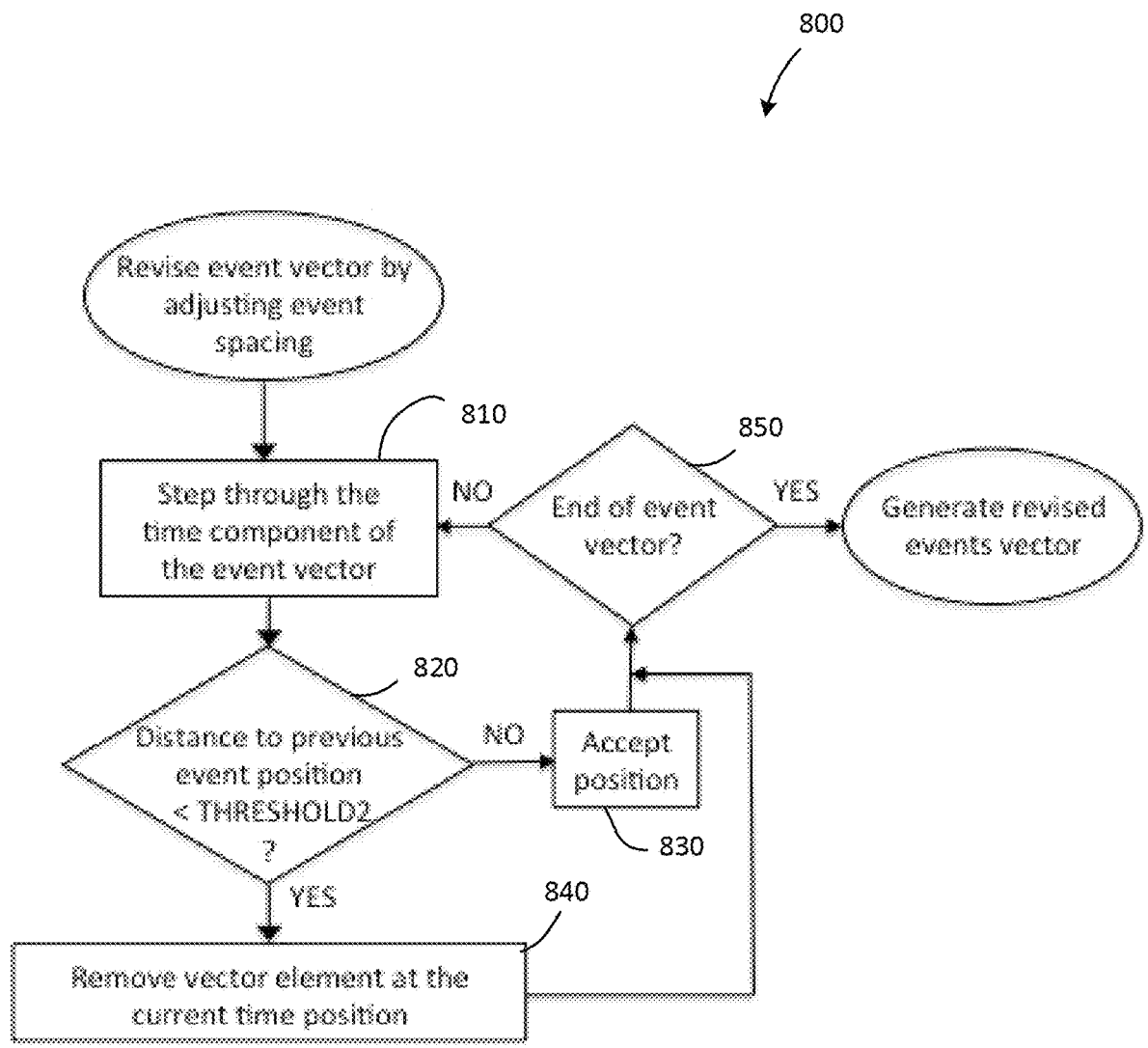
FIG. 8 is a flowchart depicting a method for further selection of desired crowd noise events, according to one embodiment.

FIG. 8 is a flowchart depicting a method 800 for further selection of desired crowd noise events, according to one embodiment. Method 800 may remove event vector elements spaced below a minimum time distance between adjacent events, according to one embodiment. Method 800 may start with a step 810 in which system 100 steps through the event vector elements one at a time. In a query 820, the time distance to the previous event position may be tested. Pursuant to query 820, if this time distance is below a threshold, that position may be skipped in a step 830. If the time distance is not below the threshold, that position may be accepted in a step 840. In either case, method 800 may proceed to a query 850. Pursuant to query 850, if the end of the event vector has been reached, a revised event vector may be generated, with the vector elements deemed to be too closely spaced together removed. If the end of the event vector has not been reached, step 810 may continue and additional vector elements may be removed as needed.

Figure 9:
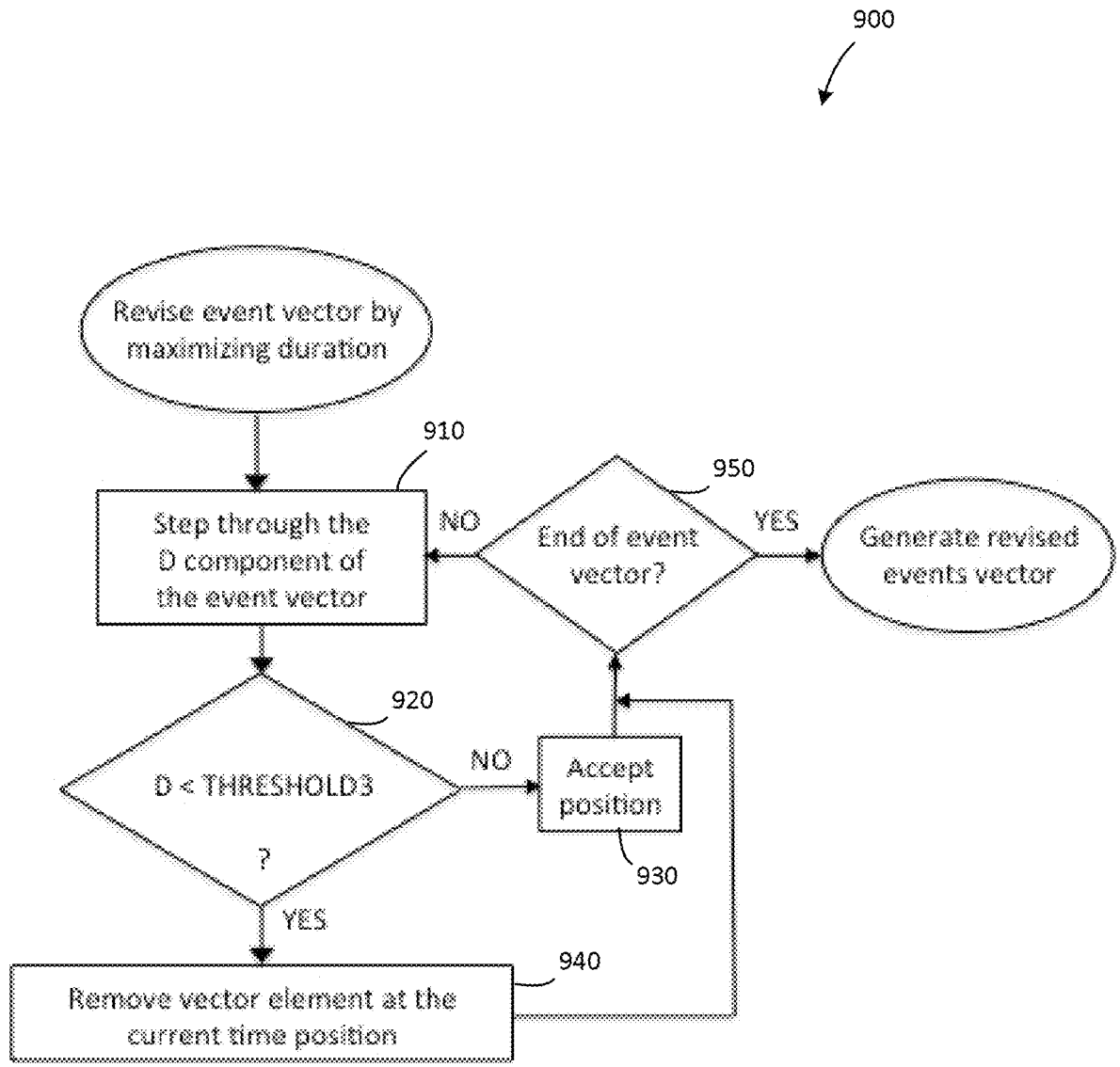
FIG. 9 is a flowchart depicting a method for further selection of desired crowd noise events, according to one embodiment.

FIG. 9 is a flowchart depicting a method 900 for further selection of desired crowd noise events, according to one embodiment. Method 900 may remove event vector elements with crowd noise duration below a desired level. Method 900 may start with a step 910 in which system 100 steps through the duration components of the event vector. In a query 920, the duration component of the event vector element may be tested. Pursuant to query 920, if this duration is below a threshold, that event vector element may be skipped in a step 940. If the duration is not below the threshold, that event vector element may be accepted in a step 930. In either case, method 900 may proceed to a query 950. Pursuant to query 950, if the end of the event vector has been reached, a revised event vector may be generated, with the vector elements deemed to represent crowd noise of insufficient duration removed. If the end of the event vector has not been reached, step 910 may continue and additional vector elements may be removed as needed.

Figure 10:
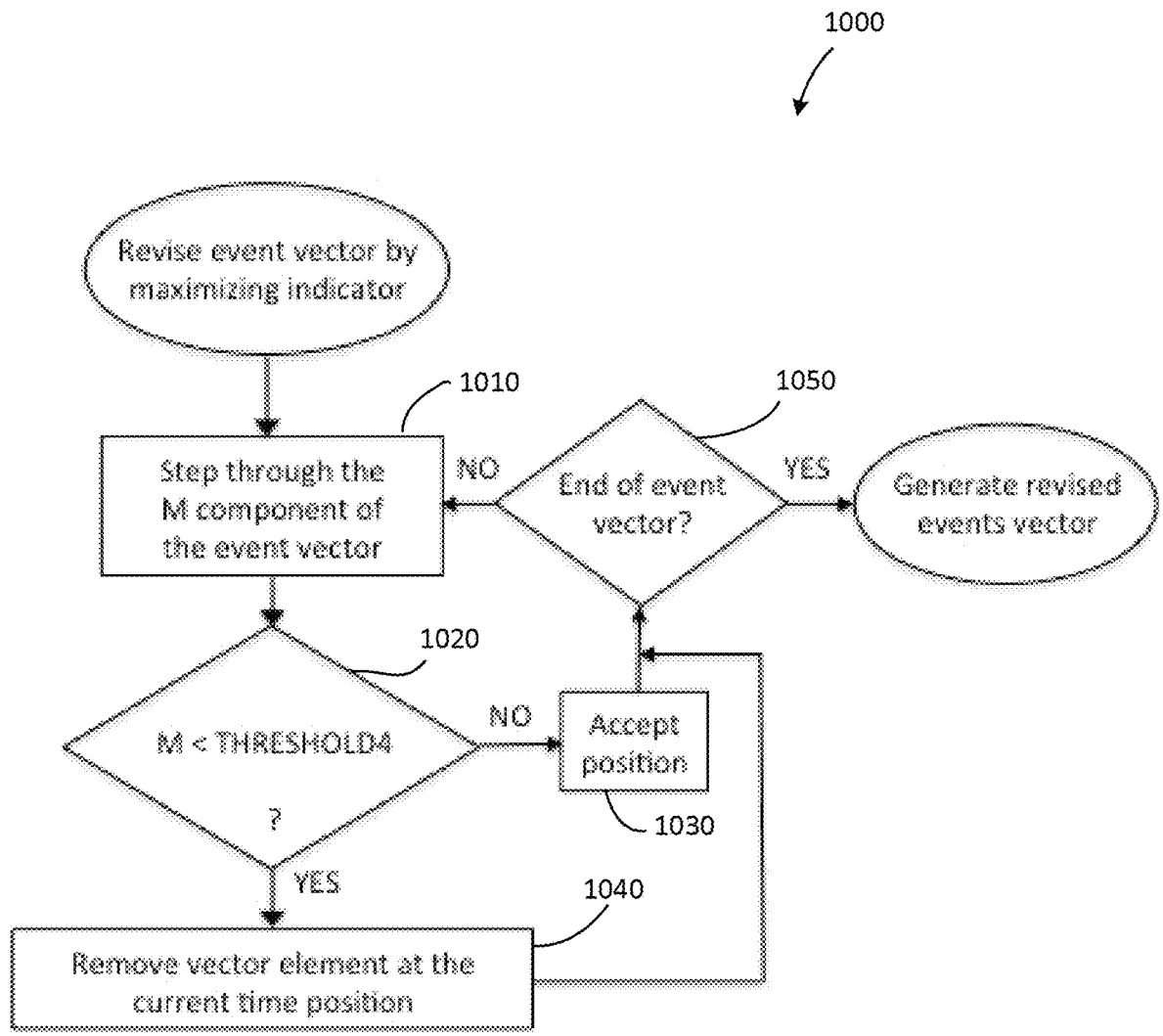
FIG. 10 is a flowchart depicting a method for further selection of desired crowd noise events, according to one embodiment.

FIG. 10 is a flowchart depicting a method 1000 for further selection of desired crowd noise events, according to one embodiment. Method 1000 may remove event vector elements with crowd magnitude indicators below a desired level. Method 1000 may start with a step 1010 in which system 100 steps through the event vector and subsequent selection. In a query 1020, the magnitude of the crowd noise event may be tested. Pursuant to query 1020, if this magnitude is below a threshold, that event vector element may be skipped in a step 1040. If the magnitude is not below the threshold, that position may be accepted in a step 1030. In either case, method 1000 may proceed to a query 1050. Pursuant to query 1050, if the end of the event vector has been reached, a revised event vector may be generated, with the vector elements deemed to be of insufficient crowd noise magnitude removed. If the end of the event vector has not been reached, step 1010 may continue and additional vector elements may be removed as needed.

The event vector post-processing steps as described in FIGS. 8, 9, and 10 may be performed in any desired order. The depicted steps can be performed in any combination with one another, and some steps can be omitted. At the end of the event vector processing, a new, final, event vector may be generated, containing a desired event timeline for the sporting event.

In at least one embodiment, the automated video highlights and associated metadata generation application receives a live broadcast audiovisual stream comprising audio and video components, or a digital audiovisual stream received via a computer server, and processes audio data 154 extracted from the audiovisual stream using digital signal processing techniques so as to detect distinct crowd noise (e.g., audience cheering), as described above. These events may be sorted and selected using the techniques described herein. Extracted information may then be appended to sporting event metadata 224 associated with the sporting event television programming video and/or video highlights 220. Such metadata 224 may be used, for example, to determine start/end times for segments used in highlight generation. As described herein and in the above-referenced related applications, highlight start and/or end times can be adjusted based on an offset which can in turn be based on an amount of time available for the highlight, importance and/or excitement level of the highlight, and/or any other suitable factor. Additionally or alternatively, metadata 224 may be used to provide information to a user 150 during viewing of the audiovisual stream, or highlight 220, such as the corresponding excitement level 230 or crowd excitement level 232.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment", or to "an embodiment", means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may be more convenient to construct specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for extracting metadata from depiction of an event, the method comprising:
   at a data store, storing audio data depicting at least part of the event;
   at a processor, automatically pre-processing the audio data to generate a spectrogram, in a spectral domain, for at least part of the audio data;
   at the processor, automatically identifying one or more portions of the audio data that indicate crowd excitement at the event; and
   at the data store, storing metadata comprising at least a time index indicating a time, within the depiction of the event, at which each of the one or more portions occurs;
   wherein automatically identifying the one or more portions comprises:

identifying spectral magnitude peaks in each position of a sliding two-dimensional time-frequency analysis window of the spectrogram;

for each position of the sliding two-dimensional time-frequency analysis window, generating a spectral indicator representing an average spectral peak magnitude; and using the spectral indicators to form a vector of spectral indicators with associated time portions.

2. The method of claim 1, further comprising:

identifying runs of pairs of spectral indicators and associated analysis window time positions with contiguous time spacing below a threshold;

capturing the identified runs in a set of R vectors; and forming a vector E with R vectors as its elements.

3. The method of claim 2, further comprising extracting a run length for each of the R vectors by counting elements of each R vector.

4. The method of claim 2, further comprising processing elements of the R vectors to obtain a maximum magnitude indicator for each R vector.

5. The method of claim 4, further comprising extracting the time index for each of the R vectors.

6. The method of claim 5, further comprising generating a preliminary event vector by replacing each of the R vectors in the vector E with a parameter triplet representing the maximum magnitude indicator, the time index, and a run length.

7. The method of claim 6, further comprising processing the preliminary event vector to generate crowd noise event information comprising the time index.

8. A non-transitory computer-readable medium for extracting metadata from depiction of an event, comprising instructions stored thereon, that when executed by a processor, perform steps comprising:

causing a data store to store audio data depicting at least part of the event;

automatically pre-processing the audio data to generate a spectrogram, in a spectral domain, for at least part of the audio data prior to automatic identification of one or more portions of the audio data that indicate crowd excitement at the event;

automatically identifying one or more portions of the audio data that indicate crowd excitement at the event; and causing the data store to store metadata comprising at least a time index indicating a time, within the depiction of the event, at which each of the one or more portions occurs;

wherein automatically identifying the one or more portions comprises:

identifying spectral magnitude peaks in each position of a sliding two-dimensional time-frequency analysis window of the spectrogram;

for each position of the sliding two-dimensional time-frequency analysis window, generating a spectral indicator representing an average spectral peak magnitude; and using the spectral indicators to form a vector of spectral indicators with associated time portions.

9. The non-transitory computer-readable medium of claim 8, further comprising instructions stored thereon, that when executed by the processor, further perform the steps comprising:

identifying runs of pairs of spectral indicators and associated analysis window time positions with contiguous time spacing below a threshold;

capturing the identified runs in a set of R vectors; and forming a vector E with R vectors as its elements.

10. The non-transitory computer-readable medium of claim 9, further comprising instructions stored thereon, that when executed by the processor, further perform the steps comprising:

extracting a run length for each of the R vectors by counting elements of each R vector;

process elements of the R vectors to obtain a maximum magnitude indicator for each R vector;

extract the time index for each of the R vectors;

generate a preliminary event vector by replacing each of the R vectors in the vector E with a parameter triplet representing the maximum magnitude indicator, the time index, and a run length; and process the preliminary event vector to generate crowd noise event information comprising the time index.

11. A system for extracting metadata from depiction of an event, the system comprising:

a data store configured to store audio data depicting at least part of the event; and a processor configured to:

automatically pre-process the audio data to generate a spectrogram, in a spectral domain, for at least part of the audio data; and automatically identify one or more portions of the audio data that indicate crowd excitement at the event;

wherein:

the data store is further configured to store metadata comprising at least a time index indicating a time, within the depiction of the event, at which each of the one or more portions occurs; and automatically identifying the one or more portions comprises:

identifying spectral magnitude peaks in each position of a sliding two-dimensional time-frequency analysis window of the spectrogram;

for each position of the sliding two-dimensional time-frequency analysis window, generating a spectral indicator representing an average spectral peak magnitude; and using the spectral indicators to form a vector of spectral indicators with associated time portions.

12. The system of claim 11, wherein the processor is further configured to:

identify runs of pairs of spectral indicators and associated analysis window time positions with contiguous time spacing below a threshold;

capture the identified runs in a set of R vectors; and form a vector E with R vectors as its elements.

13. The system of claim 12, wherein the processor is further configured to:

extract a run length for each of the R vectors by counting elements of each R vector;

process elements of the R vectors to obtain a maximum magnitude indicator for each R vector;

extract the time index for each of the R vectors;

generate a preliminary event vector by replacing each of the R vectors in the vector E with a parameter triplet representing the maximum magnitude indicator, the time index, and the run length; and process the preliminary event vector to generate crowd noise event information comprising the time index.

* * * * *